United States Patent
Cheng et al.

(10) Patent No.: US 7,492,764 B2
(45) Date of Patent: Feb. 17, 2009

(54) SYSTEM FOR MANAGEMENT OF EQUIPMENT DEPLOYED BEHIND FIREWALLS

(75) Inventors: Shih-An Cheng, Fremont, CA (US); Don Mahurin, Mountain View, CA (US); Yuesheng Zhu, San Jose, CA (US); Chen-Huei Chang, Cupertino, CA (US)

(73) Assignee: Innomedia PTE Ltd, Singapore (SG)

( * ) Notice: Subject to any disclaimer, the term of this patent is extended or adjusted under 35 U.S.C. 154(b) by 1026 days.

(21) Appl. No.: 10/962,734

(22) Filed: Oct. 12, 2004

(65) Prior Publication Data

US 2006/0077988 A1    Apr. 13, 2006

(51) Int. Cl.
*H04L 12/28* (2006.01)
(52) U.S. Cl. .................... 370/389; 370/401; 709/224
(58) Field of Classification Search ............... 370/401, 370/389; 709/224
See application file for complete search history.

(56) References Cited

U.S. PATENT DOCUMENTS

| | | | |
|---|---|---|---|
| 5,651,006 A * | 7/1997 | Fujino et al. ............... 370/408 |
| 6,363,421 B2 * | 3/2002 | Barker et al. ............... 709/223 |
| 2002/0094070 A1 | 7/2002 | Mott et al. | |
| 2004/0044758 A1 * | 3/2004 | Palmer et al. ............... 709/223 |
| 2005/0021702 A1 * | 1/2005 | Rangarajan et al. ......... 709/223 |
| 2005/0105508 A1 * | 5/2005 | Saha .......................... 370/352 |
| 2006/0091999 A1 * | 5/2006 | Howarth .................... 340/10.3 |
| 2006/0092931 A1 * | 5/2006 | Walter et al. ............... 370/389 |
| 2006/0200547 A1 * | 9/2006 | Edwards et al. ............ 709/224 |

* cited by examiner

*Primary Examiner*—Chirag G Shah
*Assistant Examiner*—Suk Jin Kang
(74) *Attorney, Agent, or Firm*—Timothy P. OHagan

(57) ABSTRACT

An element management system enables a network management server to provide a variable value to a management information base of a managed device independent of whether the managed device is served by a network address translation firewall. The element management system comprises an SNMP message manager which receives periodic heart beat frames from the managed device and stored identification of a heart beat channel in association with identification of the managed device in a registration table. The heart beat channel comprises the source socket and destination socket of the heart beat frame. The SNMP message manager further uniquely associates an assigned UDP port number with the managed device and provides the unique association of the assigned UDP port and the managed device to the network management server. The SNMP message manager further receives an SNMP Set from the network management server embodied as an IP frame addressed to the assigned UDP port number, looks up the managed device associated with the assigned UDP port number, and sends the SNMP Set to the managed device using the heartbeat channel.

15 Claims, 13 Drawing Sheets

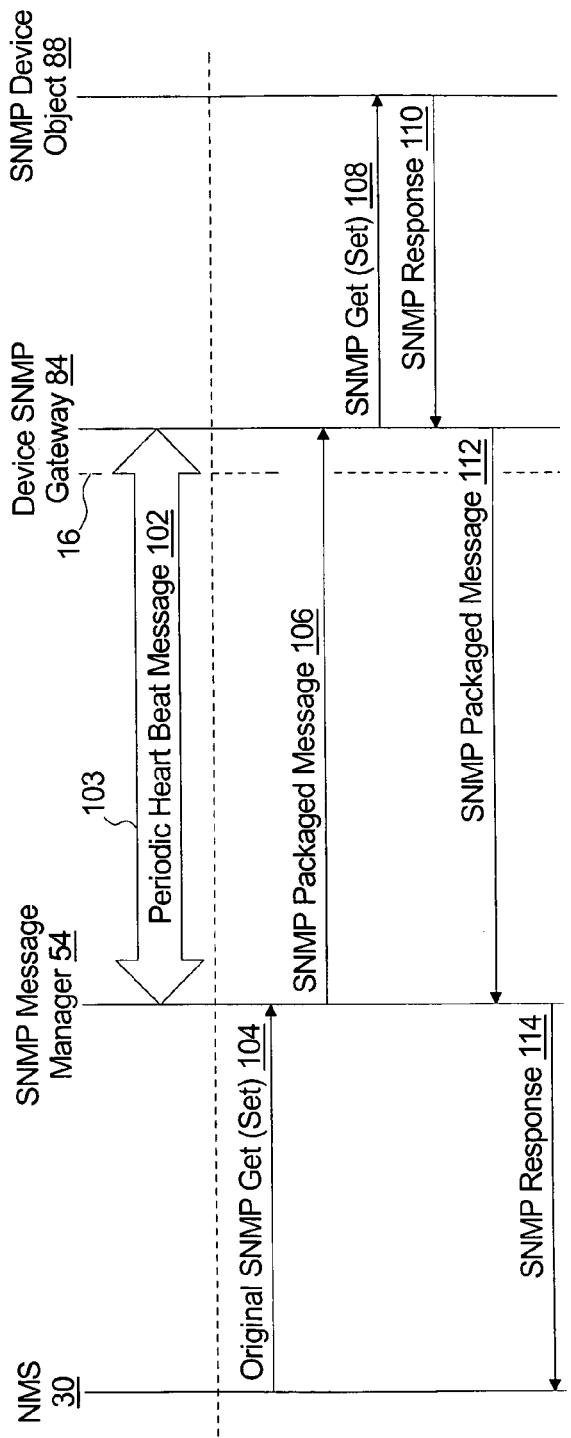

(Heart Beat)

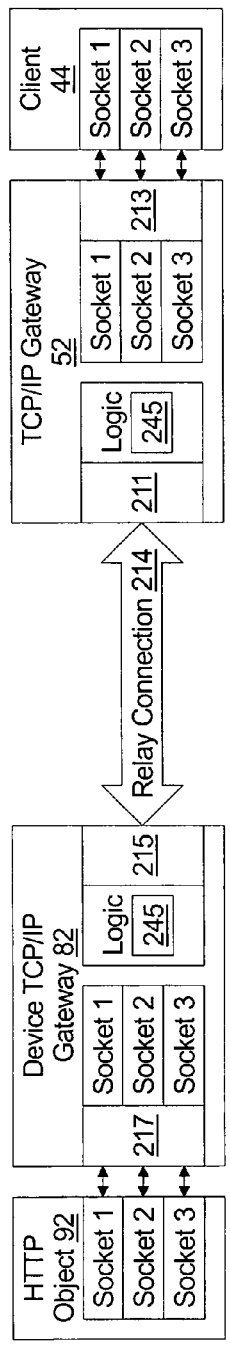
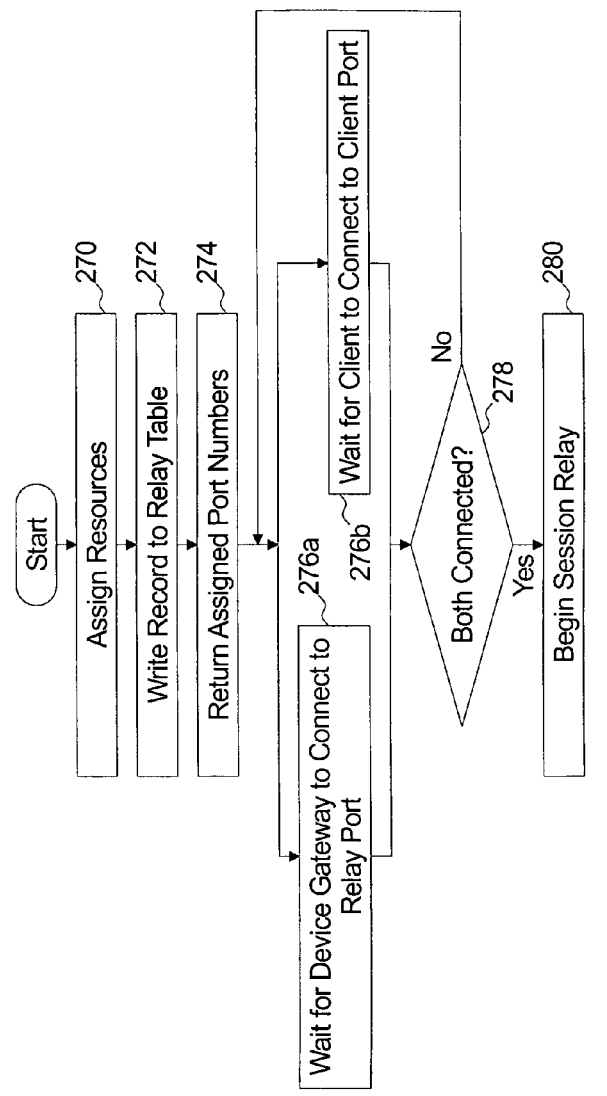
Figure 8
Figure 9

(Device TCP/IP Gateway)

(SNMP Message Manager)

(Device SNMP Gateway)

(Device SNMP Gateway)

(EMS Client Application)

(SNMP Message Manager)

SYSTEM FOR MANAGEMENT OF EQUIPMENT DEPLOYED BEHIND FIREWALLS

TECHNICAL FIELD

The present invention relates to the management of Internet telephony equipment deployed behind firewalls and more particularly to a system for interfacing between equipment deployed behind a firewall and a simple network management protocol (SNMP) based Network Management System (NMS) and HTTP and Telnet clients.

BACKGROUND OF THE INVENTION

Development of the Internet protocols (IP) has facilitated widespread deployment of IP compliant packet switched networks for transferring of data between devices. Further, the IP addressing scheme enables the interconnecting of these IP compliant networks forming the Internet. When a device is coupled to an IP compliant network it is assigned an IP address. If the IP address is globally unique, any remote device can address IP compliant frames to the device using such globally unique IP address.

Because of the limited number of IP addresses available, certain blocks of IP addresses, referred to as private network addresses, have been set aside for use on private networks. These private network IP addresses are assigned and maintained locally and are therefore routable only on the local area network (LAN) on which the private network IP address is unique. Private network IP addresses are not globally routable on the Internet. A network address translation system (NAT) is used to couple the LAN to the Internet in a manner that enables all of the devices on the LAN to share the globally unique Internet routable IP address(es) assigned to the NAT system.

A NAT system does not allow any global Internet entity to connect to any private LAN entity unless the NAT system is configured with specific connection rules to enable certain LAN entities to operate as servers for clients outside the LAN. As such, a NAT system protects LAN entities from outside intrusion acting, as is known in the networking literature, as a "firewall".

In a separate but related field of development, the Simple Network Management Protocols (SNMP) has been developed to enable a centrally located network management system (usually referred to an "NMS") to monitor a large number of client devices (each operating as an SNMP agent) coupled to the network.

Each SNMP compliant agent implements a management information base (MIB) that includes variables required for monitoring, configuring, and controlling the client device. The SNMP protocol specifies a set of messages that may be exchanged between the NMS and each agent for the exchange of values associated with variables defined by the MIB. The SNMP messages are usually exchanged using the connectionless UDP/IP protocol. More specifically, SNMP messages are sent to an agent by addressing the message to the agent using the agent's IP address and UDP port 161. Responses are returned to the NMS by addressing the response to the NMS's IP address and the dynamic port from which the NMS sent the original message to the agent. Asynchronous Traps (unsolicited messages sent by the agent to the NMS) are sent to the NMS's IP address and UDP port 162.

A challenge with use of the SNMP protocols on a private network with private network IP addresses is that the messages may only be sent to an agent if the NMS is on the same LAN such that the agent's private network IP address is routable. An NMS on the global side of a NAT system can-not manage an agent on the private network side of the NAT system utilizing the messaging protocols discussed above because it can-not reach the entities with private network addresses.

To enable SNMP based management of a plurality of devices deployed on different kinds of networks that may not all be reachable by a single NMS, hierarchical distribution systems have been developed. A NMS may manage the plurality of devices through various distribution agents which act as SNMP "proxy" agents for the devices. There exists a distribution agent (with a private network IP address) on each LAN for managing the agents (with private network IP addresses) on that particular LAN. The distribution agent communicates each SNMP message with the NMS using traditional SNMP messaging through a "permanent hole" configured thought the LAN's firewall and communicates each SNMP message with the managed agent using SNMP messaging over the LAN.

A first problem with existing hierarchical solutions is that they require that a distribution agent to be present on each LAN on which a managed agent is located. In the context of managing Internet telephony devices, there may only be a small quantity of managed Internet telephony devices coupled to each LAN—such as one or two. As such, use of an existing hierarchical solution would require a quantity of distribution agents that approaches the number of Internet telephony devices deployed. Deploying such a large number of distribution agents is not practical.

A second problem with the existing hierarchical solutions is that the private network on which the distribution agent is located must be manually configured to enable the distribution agent to communicate with the NMS through a firewall hole. In the context of managing Internet telephony devices, the Internet telephony service provider will not have control over each LAN and will not be able to configure the LAN's firewall to permit the traditional UDP/IP communication between the NMS and the distribution agent.

In yet another related field of development, the Telnet protocols and HTTP protocols enable a user of a management workstation (operating a Telnet client or an HTTP client) to interface with a Telnet object or HTTP object (operating as a server) within a managed device to configure operating variables of the managed device.

A problem with use a Telnet session or an HTTP session to configure operating variables of a workstation on the global side of a NAT system can not manage a managed device on the private network side of the NAT system because the session can not be established through the NAT system.

What is needed is a network management system that enables a network management server, a Telnet client, and/or an HTTP client on a global network side of a NAT server to monitor, configure, and otherwise manage a plurality if managed devices independent of whether such managed devices are coupled to private networks and server by NAT systems.

SUMMARY OF THE INVENTION

A first aspect of the present invention is to provide an element management system for enabling an SNMP network management server (NMS) to provide a variable value to (or obtain a variable value from) a management information base (MIB) of a managed device independent of whether the managed device is served by a network address translation (NAT) firewall.

The system comprises an SNMP message manager coupled to a network which enables the exchange of IP frames between each of the NMS and a public network interface of the NAT firewall.

The system further comprises, embodied in the managed device, a device SNMP gateway and an SNMP object (e.g. an SNMP Daemon). The device SNMP gateway is: i) communicatively coupled to the private network for exchanging IP frames with the NAT firewall; and ii) communicatively coupled to the SNMP object through a UDP/IP services module which enables the exchange of UDP/IP messages there between using UDP/IP ports selected in accordance with known SNMP systems.

The SNMP object includes read/write access to the management information base and comprises known SNMP systems for at least: i) receiving an SNMP Set message sent on a predefined SNMP port number and writing a variable value within the SNMP Set to the management information base; and ii) receiving an SNMP Get message sent by the SNMP gateway to the predefined SNMP port number and returning an SNMP response to the source socket on which the SNMP Get was received.

The device SNMP gateway comprises a heart beat module and a message handling module to maintain an open UDP/IP channel between the device SNMP gateway and the SNMP message manager. The heart beat module periodically sends a heart beat IP frame to a socket associated with the SNMP message manager through the NAT firewall. Each heart beat frame includes identification of the managed device.

The SNMP message manager receives each periodic heart beat frame from the managed device and stores identification of a heart beat channel in association with identification of the managed device in a registration table. The heart beat channel comprises the source socket and destination socket of the heart beat frame.

The SNMP message manager further assigns a UDP port number (e.g. a proxy socket) in unique association with the managed device and provides identification of the assigned UDP port and the managed device to the NMS. This enables the NMS to send SNMP messages to the unique port number associated with a managed device and enables the SNMP message manager to look up the managed device associated with the port number on which an SNMP message is received.

With respect to the transfer of an SNMP Get and SNMP Response exchange, the SNMP message manager: i) receives an SNMP Get from the NMS embodied as a UDP/IP packet addressed to the assigned UDP port number; ii) looks up the managed device associated with the assigned UDP port number; iii) assigns a unique sequence number to the SNMP Get and records the unique sequence number (in association with identification of the managed device and in association with the UDP port number which the NMS used as a source port for sending SNMP Get (e.g. the message specific UDP port); iv) sends the SNMP Get in combination with the unique sequence number to the managed device using the heartbeat channel; v) receives an SNMP Response in combination with the sequence number; vi) obtains the source socket corresponding to the sequence number in the message table; and vii) sends the SNMP Response to the source socket of the network management server.

With respect to the transfer of an SNMP Get and SNMP Response exchange, the device SNMP gateway: i) receives the SNMP Get in combination with the unique sequence number; ii) assigns a message specific socket from which the device SNMP gateway sends the SNMP Get to the SNMP object and associates the message specific socket with the unique sequence number in a local response table; iii) sends the SNMP Get to the SNMP object from the message specific socket; iv) receives an SNMP Response addressed to the message socket from the SNMP object; v) obtains the sequence number associated with the message specific socket from the local response table; and vi) sends the SNMP Response in combination with the sequence number to the SNMP message manager.

With respect to transfer of an SNMP Set, the SNMP manager performs at least the following steps: i) receives an SNMP Set from the NMS embodied as a UDP/IP frame addressed to the assigned UDP port number; ii) looks up the managed device associated with the assigned UDP port number; and iii) sends the SNMP Set to the managed device using the heartbeat channel.

With respect to transfer of an SNMP Set, the message handling module of the device SNMP gateway performs at least the following steps: i) receives the SNMP Set; and ii) sends the SNMP Set to the SNMP object as a UDP/IP message addressed to the predefined SNMP port number.

In an exemplary embodiment, the SNMP message manager sends the SNMP Get (or the SNMP Set) as encrypted payload of an SNMP packaged message and the unique sequence number as a header of the SNMP packaged message. And, the SNMP Response is encrypted payload of an SNMP packaged message and the sequence number is a header of the SNMP packaged message.

The element management system may further comprise a TCP/IP gateway for enabling a client (such as a web browser client or a Telnet client) to establish a session to an object server (such as an HTTP server or a Telnet server) of the managed device. The TCP/IP gateway, upon receipt of a resource request from a client application of the element management server: i) associates a client port with a relay port in a relay table; and ii) identifies the client port and the relay port to the client application of the element management server.

The client application of the element management server provides for: i) receiving identification of the relay port and client port form the TCP/IP gateway; ii) embodying identification of the relay port as a URL embodied as a variable value within an SNMP Set; and iii) sending the SNMP Set to the device SNMP gateway using the heartbeat channel—whereby the URL is written to the MIB. The managed device uses the URL to establish a relay connection to the TCP/IP gateway.

The TCP/IP gateway further: i) establishes a relay connection with the managed device upon initiation of the connection from the managed device, through the NAT, to the relay port; ii) establishes a first client connection upon initiation of the connection from the client using a socket that comprises the client port; and iii) relays data packets between the client connection and the managed device through the relay connection.

With respect to data packets being sent from the client to the object server, the relay of data packets comprises: i) receiving a data packet on a socket from the client; ii) looking up a session ID number that is uniquely associated with the socket in a relay table; iii) building a packaged frame comprising the session ID and an encrypted representation of the data packet; and iv) sending the packaged frame on the relay channel that is uniquely associated with the client port of the socket.

With respect to data packets being sent form the object server to the client, the relay of data packets, comprises: i) receiving a packaged frame on the relay channel; ii) recovering a session ID and the data packet from the packaged frame;

and iii) sending the data packet to the client using the socket that is uniquely associated with the recovered session ID.

Further, each session may comprise additional TCP/IP connections. Therefore, with respect to additional TCP/IP connections established by the first client, the relay of data packets comprises: i) establishing a new TCP/IP connection upon initiation by the client using a second socket comprising the client port; ii) assigning a unique session ID to the second socket and associating the session ID to the second socket in the relay table; iii) sending a new session message and the session ID to the managed device using the relay connection that is associated with the client port.

With respect to additional TCP/IP connections established by the server object, the relay of data packets comprises: i) receiving a new session message and a session ID from the managed device on the relay connection; ii) establishing a new TCP/IP connection to the client using a second socket comprising the client port; and iii) associating the session ID with the second socket in the relay table.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 3 is a diagram representing an exemplary SNMP packaged message in accordance with one embodiment of the present invention;

FIG. 4 is a ladder diagram representing the exchange of SNMP messages between a network management server and a managed device in accordance with one embodiment of the present invention;

FIG. 8 is a diagram useful in discussing exemplary operation of the TCP/IP gateway and the device TCP/IP gateway in accordance with one embodiment of the present invention;

FIG. 9 is a flow chart representing exemplary operation of a TCP/IP gateway in accordance with one embodiment of the present invention;

DETAILED DESCRIPTION OF THE EXEMPLARY EMBODIMENTS

Figure 1:
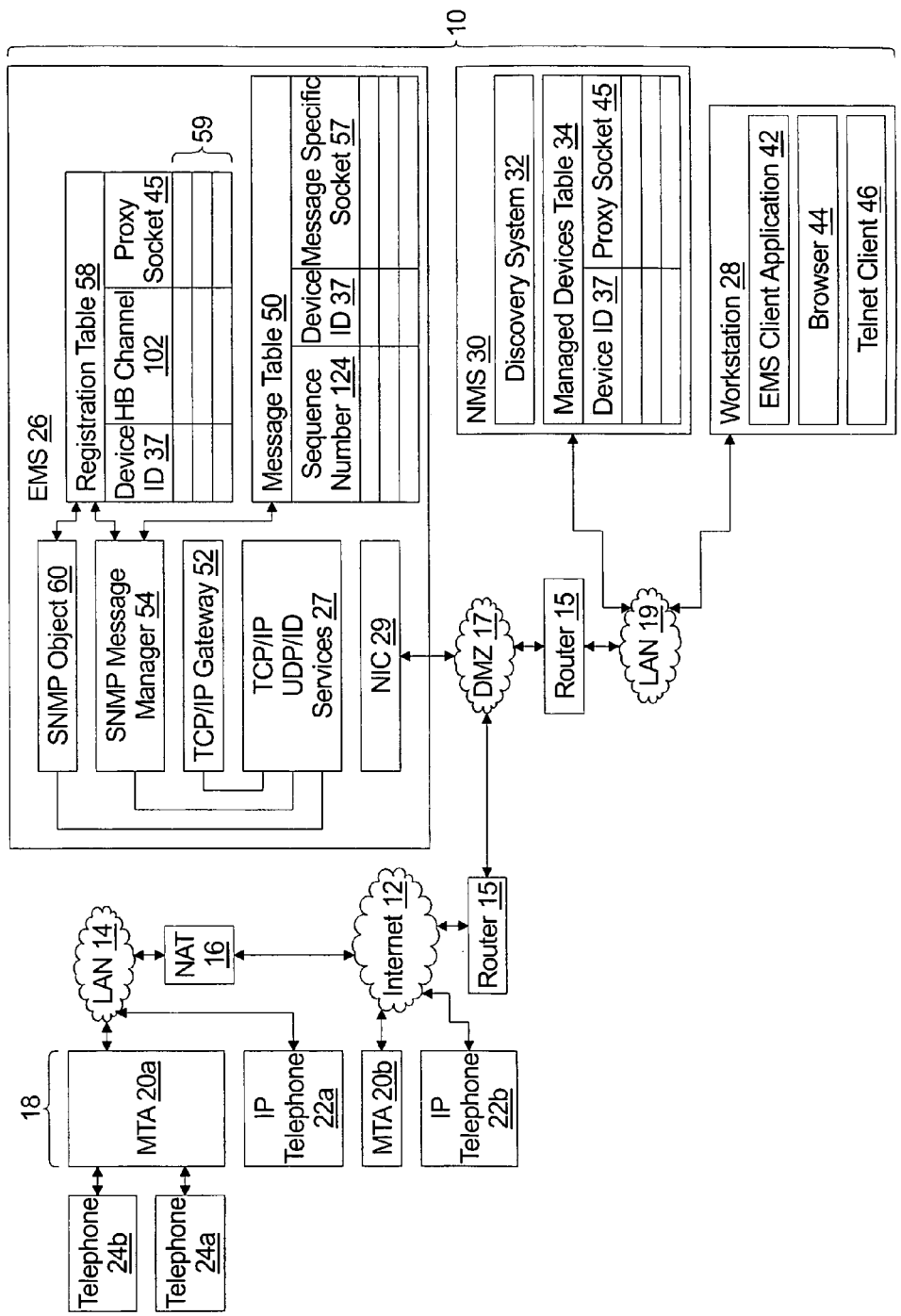
FIG. 1 is a block diagram representing architecture of a system for providing network management services to a plurality of managed devices in accordance with on embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a system 10 for providing network management services to a plurality of management clients 18 in an environment wherein at least a portion of the management clients 18 are coupled to a local area network (LAN) 14 and served by a network address and port translation (NAT) firewall 16.

In the exemplary embodiment, the management clients 18 comprise: i) IP telephones 22a coupled to the LAN 14; ii) IP telephones 22b coupled directly to the Internet 12; iii) multimedia terminal adapter (MTA) 20a coupled to the LAN 14; and iv) MTA 20b coupled directly to the Internet 12.

Those devices which are referred to as "coupled to the Internet 12" may be coupled to an Internet service network which assigns a globally unique IP address (e.g. a public IP address) to the device and does not utilize a NAT firewall. For purposes of simplicity, such Internet service network is not shown and the device is simply referred to as "coupled to the Internet 12".

Those devices which are referred to as "coupled to the LAN 14" are assigned an IP address selected from a class of IP network addresses reserved for private networks (e.g. a private IP address) which are un-routable on the Internet 12. These devices communicate with other IP compliant devices over the LAN 14 and the NAT firewall 16 operates as an IP layer proxy to enable the devices to communicate with remote devices over the Internet 12.

More specifically, the NAT firewall 16 performs both address translation and port translation on each IP frame that is routed to the NAT firewall 16 on the local area network 14 (e.g. the private network side of the NAT firewall 16). The address translation includes translating the source IP address of the IP frame to a globally unique IP address assigned to the NAT firewall 16. Port translation includes translating the source port number of the IP frame to a dynamically assigned port number available to the NAT firewall 16.

The translation of each outbound frame is recorded in a record within a translation table. The translation table record associates the private network source IP address and source port number of the outbound frame (e.g. the frame routed to the NAT firewall 16 on the local area network 14) to the globally unique IP address of the NAT firewall 16 and the port number assigned by the NAT firewall 16. For added security, the translation table record may further include the destination network address and port number to which the outbound frame was addressed.

An inbound frame will include a destination address and port number. The destination address is the globally unique address of the of the NAT firewall 16. The globally unique address of the NAT firewall 16 is what enables the inbound frame to be routed to the public network side of the NAT firewall 16 over the Internet 12. The NAT firewall 16 will then look up, in the translation table, the local area network IP address and port number (source socket of the outbound IP frame) which associates with the IP address to which the inbound frame was addressed. For security, the NAT firewall 16 may further verify that the source address and port number of the inbound frame matches the destination address and port number of the outbound frame—as stored in the translation table.

Provided a record exists in the translation table, the NAT firewall 16 will reverse translate the inbound frame by replacing the destination address and port number of the inbound frame with the source address and port number of the outbound frame. The reverse translated frame is then routed (by the private network side of the NAT firewall 16) on the local area network 14.

Because an inbound frame can only be routed on the local area network 14 if it corresponds to a record in the translation table, the NAT firewall 16 prevents a device coupled to Internet 12 from sending a UDP/IP frame to the client on the local area network 14 unless that frame is sent in response to an outbound frame originated by the client and uses the UDP/IP channel established by the outbound frame. Therefore, as discussed in the background, a traditional SNMP network management architecture is unable to provide management services to managed devices behind a NAT firewall 16.

The management system 10 of the present invention includes a network management server (NMS) 30, a management workstation 28, and an element management server (EMS) 26 which, in combination, manage the plurality of management clients 18. The management system 10 may be implemented with an architecture that includes a network commonly known as a "DMZ network" 17, a private local area network (LAN) 19, and routers 15 which interconnect the DMZ network with the Internet 12 and the LAN 19.

In this exemplary architecture, the EMS 26 is coupled to the DMZ network 17 and each of the NMS 30 and the management workstation 42 are coupled to the private network 19. As such, security is provided in that devices on the Internet 12 can not establish connections to the NMS 30 or the management workstation 28.

In operation, the NMS 30, the workstation 28, and the EMS 26 manage each of the managed devices 18 using SNMP message exchanges, Telnet sessions, or HTTP sessions with each of the plurality of management clients 18 through the EMS 26.

More specifically, the NMS 30 may be a known network management system which utilizes the simple network management protocol (SNMP) to exchange variable values with each of the managed devices 18. However, because at least a portion of the managed devices 18 may be coupled to a private network 14 and assigned a non-routable IP address, the NAT firewall 16 is not capable of routing inbound SNMP messages addressed thereto. Therefore, as well be discussed in more detail, SNMP messages are exchanged between a managed device 18 and the NMS 30 through the EMS 26 which, using the systems discussed herein, maintains a dynamic communication channel (as opposed to a preconfigured firewall hole) with the managed device 18 through the NAT firewall 16.

The management workstation 28 may be a known hardware workstation system operating each of an EMS client application 42, a web browser 44, and a Telnet client 46. In operation, the EMS client application 42 enables a user of the workstation 28 to select a particular one of the plurality of managed clients 18 to manage using either an HTTP session or a Telnet session with an HTTP server or a Telnet server within the managed client 18. Again however, because at least a portion of the managed devices 18 may be coupled to a private network 14 and assigned a non-routable IP address, neither an HTTP nor a Telnet session may be established to the managed device 18 because the NAT firewall 16 is not capable of routing an inbound frame to open the session. Therefore, as well be discussed in more detail, the HTTP session or the Telnet session is tunneled through a TCP/IP connection established between the managed device 18 and the EMS 26.

Managed Device

Figure 2:
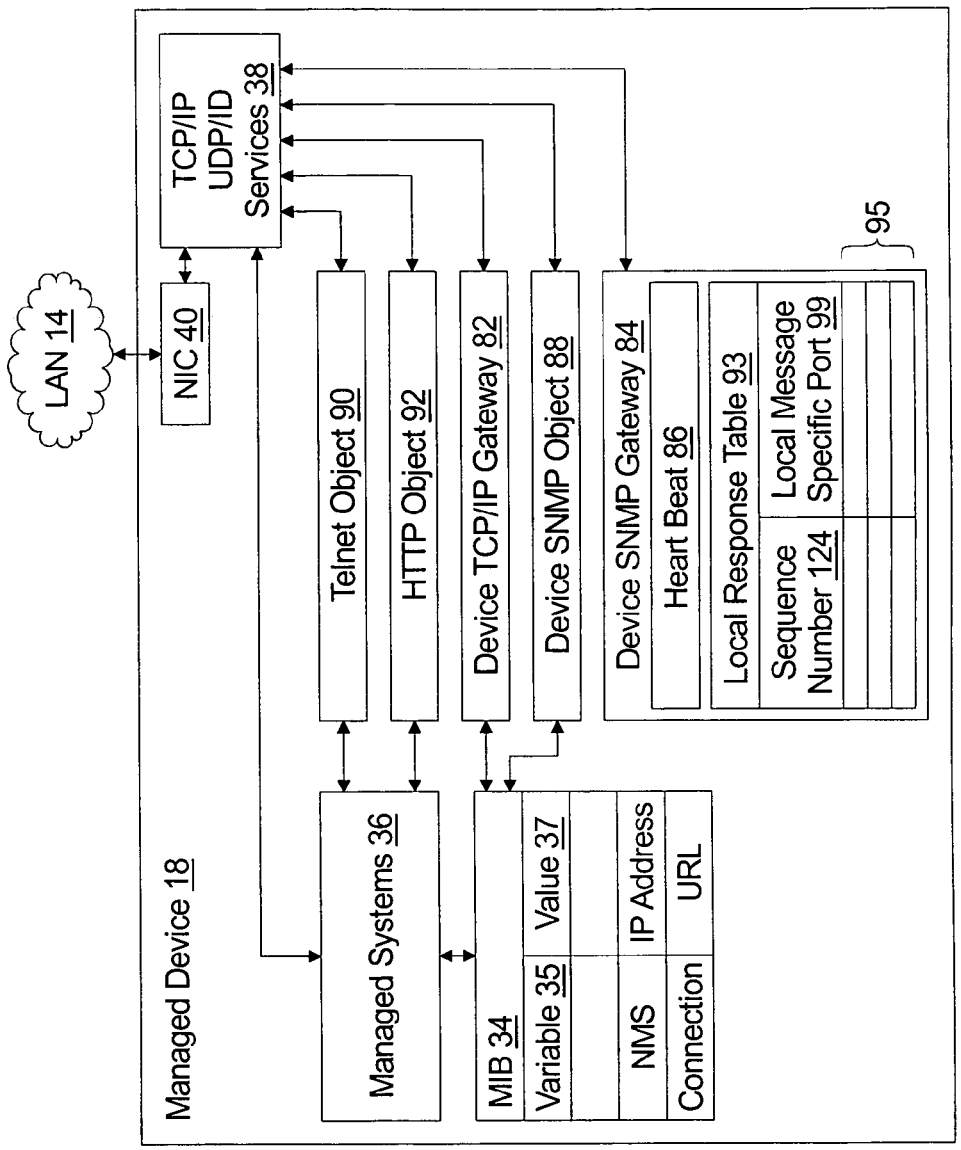
FIG. 2 is a block diagram representing an exemplary managed device in accordance with one embodiment of the present invention.

FIG. 2 is a block diagram representing an exemplary managed device 18. The managed device 18 comprises a network interface circuit 40, TCP/IP and UDP/IP services 38, and managed device systems 36 which in combination are the core operating components of the device which, in the example of an MTA 20, are the MTA systems and which, in the example of an IP telephone 22, are the IP telephone systems.

The managed device 18 further includes a management information base (MIB) 34 which stores a value 37 associated with each of a plurality of variables 35 useful for operation of the managed device systems 36. These variable values 37 are exchanged with the NMS 30 using the SNMP and the systems of the present invention.

The managed device further comprises a SNMP management object 88, a device SNMP gateway 84, a Telnet object 90, an HTTP object 92, and a device TCP/IP gateway 83—each of which is coupled to the TCP/IP and UDP/IP services 38 and communicates with other components, and remote systems, using TCP/IP and UPD/IP protocols.

The SNMP management object 88 is a known SNMP Daemon which exchanges SNMP compliant messages with an NMS. The NMS is identified by its IP address stored as a variable value 37 (associate with a variable ID 35 called NMS in this example). The SNMP compliant messages are exchanged (using UDP/IP frames sent between sockets selected using known SNMP rules) to obtain variable values from the NMS and report variable values to the NMS. Because the managed device 18 may be coupled to a local area network 14 served by a NAT firewall 16, the NMS 30 can not send messages directly to the SNMP management object 88. Therefore, the device SNMP gateway 84 facilitates the transfer of SNMP messages between the SNMP management object 88 and the NMS 30 through the EMS 26 independent of whether the managed device 18 is served by a NAT firewall 16. From the perspective of the SNMP management object 88, the device SNMP gateway 84 emulates an NMS and the IP address stored as a variable 37 in association with the NMS variable ID 35 in the MIB 34 is the IP address of the managed device 18. The well known port for sending SNMP Traps (e.g. UDP Port 162) is associated with the device SNMP gateway 84.

The Telnet object 90 may be a known Telnet server which enables a Telnet client to establish a TCP/IP connection thereto and operates a Telnet session with the client to: i) present configuration data regarding the managed device systems 36 to the client; and ii) obtain configuration data from the Telnet client. Similarly, the HTTP object 92 may be a known "Web Server" which enables an HTTP client (such as a web browser) to establish a TCP/IP connection thereto and operates an HTTP session with the web browser to: i) present configuration data regarding the managed device systems 36; and ii) obtain configuration data from the web browser.

Because the managed device 18 may be coupled to a local area network 14 served by a NAT firewall 16, a workstation operating a browser or a Telnet client can not establish a TCP/IP connection to the Telnet object 90 or to the HTTP object 92. Therefore, the device SNMP gateway 84 and the device TCP/IP gateway 83 in combination, facilitate establishing a Telnet session and/or an HTTP session through the EMS 26 independent of whether the managed device 18 is served by a NAT firewall 16.

A more detailed discussion of the structure of the EMS 26, the device SNMP gateway 84, the device TCP/IP gateway 83, and the interactive operation of the EMS 26, the device SNMP gateway 84, the device TCP/IP gateway 83 to open a Telnet session or an HTTP session between the managed device 18 and the workstation 28 is included herein.

EMS

Returning to FIG. 1, the EMS 26 comprises: i) a TCP/IP gateway 52; ii) an SNMP object 60; iii) an SNMP message manager 54; iv) a registration table 58; v) and a message table 50. Each of these components is coupled to a TCP/IP and UPD/IP services module 38 and a network interface 29 for communicating with each other and with remote systems using known TCP/IP and UPD/IP technology.

In operation, the TCP/IP gateway 52 relays the TCP/IP connections of a Telnet session or an HTTP session between the management workstation 28 and the managed device 18 through a relay channel (e.g. an outbound TC/IP connection established from the managed device 18 to the gateway 52 through the NAT firewall 16). A more detailed discussion of operation of the TCP/IP gateway 52 and the set up of a Telnet session and/or HTTP session is included herein with respect to FIGS. 5a, 5b, and 8.

The SNMP object 60 may be a known SNMP Daemon which exchanges SNMP compliant messages with the NMS 30 regarding operation of the EMS 26. More specifically, the well known port to which an NMS sends SNMP messages to a managed device (e.g. UDP/IP port 161) is associated with the SNMP object 60. As will be discussed in more detail with respect to FIG. 13, the SNMP object 60 is useful for operating a system which enables the NMS 30 to "discover" the various managed devices 18 which are operated through the EMS 26.

The SNMP message manager 54 performs two functions. The first function, referred to as a heart beat function, is to maintain a UDP/IP heart beat channel to the device SNMP gateway 84 within the managed client 18 and the second function, known as a translation function, is to translate and pass SNMP messages from the NMS 30 to the device SNMP gateway 84 (inbound translation) and from the device SNMP gateway 84 to the NMS 30 (outbound translation).

To perform the heart beat function, the SNMP message manager 54 interfaces with a heart beat component 86 of the device SNMP gateway 84. Periodically, the heart beat component 86 will generate a heart beat frame and address the frame to the EMS 26 at a UDP/IP socket associated with the SNMP message manger 54. This periodic heart beat frame assures that a NAT firewall 16 maintains a record in its translation table associated with such UDP/IP channel (e.g. the UDP/IP heart beat channel) such that the EMS 26 can send an inbound UDP/IP frame to the managed device using the heart beat channel (e.g. the same heart beat channel but with the source and destination sockets reversed).

To perform the translation function for an SNMP message received from either the NMS 30 or the EMS client application 42 of the workstation 48 (e.g. an inbound SNMP message), the SNMP message manager 54 packages the SNMP message as encrypted payload of an SNMP packaged message which is sent to the device SNMP gateway 82 using the UDP/IP heart beat channel. To perform the translation function for an SNMP packaged message received from the device SNMP gateway 84 (e.g. an outbound SNMP message), the SNMP message manager 54 de-packages the encrypted payload to recover the SNMP message and forwards the message to the NMS 30.

Turning briefly to FIG. 3, an exemplary SNMP packaged message 116 is shown. The SNMP packaged message 116 comprises the encrypted payload 128 and a plurality of headers. The encrypted payload 128 is an encrypted representation of the inbound SNMP message or the outbound SNMP message. The plurality of headers identify: a message type 118; a device type 120, the device ID 37, the sequence number 124, and the message length 126.

The message type 118 is a string which identifies the type of the SNMP packaged message. Exemplary types include: i) an SNMP Set; ii) an SNMP Get; iii) an SNMP Response; iv) an SNMP Trap; v) a heart beat message; and iv) a special type of SNMP Set referred to as a connection request.

The SNMP Set (including the connection request), SNMP Get, SNMP Response, and SNMP Trap type identifiers are used to identify the type of SNMP message included as encrypted payload 128. SNMP Set and SNMP Get are sent from the EMS 26 to the device SNMP gateway 84 and SNMP Response and SNMP Trap are sent from the device SNMP gateway 84 to the EMS 26. The heart beat type identifier identifies a type of SNMP packaged message 116 which is sent by the device SNMP gateway 84 solely to maintain the heart beat channel through the NAT 116. Such a message does not include encrypted payload 128 and does not include other headers such as the sequence number 124.

The device type 120 identifies the type of managed device 18 by a code representative of vendor and model for example. It is foreseeable that different devices may have different MIB definitions and therefore the type identification may be useful for enabling the EMS 26 to manage different device types.

The length 126 identifies the overall size of the SNMP packaged message 116. Information related to the overall size is useful for detecting loss or fragmentation of data during transmission.

The device ID 37 identifies the managed device 18 to which the SNMP packaged message 116 is being sent (or from which the SNMP packaged message 116 is being sent).

The sequence number 124 is a unique sequence number assigned to an inbound SNMP message received from the NMS 30 such as an SNMP Get. As discussed, known SNMP systems provide for an SNMP Get to be sent directly to a managed device by packaging the message as a UDP/IP frame and addressing the message: i) to a destination socket that includes the IP address of the managed device and the well known port for SNMP Get messages; and ii) from a message specific source socket that includes the IP address of the NMS 30 and a dynamically assigned UDP/IP port that the NMS 30 uniquely associates with that particular SNMP Get. An SNMP Response is sent to the NMS 30 using the message specific socket such that the SNMP Response can be associated with the original SNMP Get.

However, in the present invention, each SNMP Get and each SNMP Response is sent as an SNMP packaged message through the heart beat channel. As such, association of an SNMP Response with an original SNMP Get (by the EMS 26) using a port specifically assigned for the Get/Response message exchange is not possible. As such, the EMS 26 assigns a unique sequence number 124 to each inbound SNMP message and includes the unique sequence number 124 in the header of the SNMP packaged message 116. An SNMP Response sent as an SNMP packaged message 116 from the device SNMP gateway 84 will include the same sequence number 124 as assigned to the SNMP Get such that the EMS 26 may associate the SNMP Response with the original SNMP Get.

The ladder diagram of FIG. 4 represents an exemplary exchange of SNMP messages (such as an SNMP Get and a corresponding SNMP Response) between the NMS 30 and the SNMP management object 88 of the managed device 18 through a combination of the SNMP message manager 54 of the EMS 26 and the device SNMP gateway 84 of the managed device 18.

Referring to the ladder diagram of FIG. 4 in conjunction with FIG. 1 and FIG. 2, the heart beat module 86 of the device SNMP gateway 84 periodically sending a heart beat frame to the EMS 26 to maintain a heart beat channel 102. As discussed, the NAT firewall 16 prevents any inbound message from reaching the managed device 18 unless such message is sent as a response to an outbound message and on the same UDP channel or TCP/IP connection. As such, the heart beat module 86 periodically sends a heart beat message encapsulated in a UDP/IP frame to the EMS 26 to maintain a UDP/IP heart beat channel 102 through the NAT firewall 16. The UDP/IP frames are sent at a time interval small enough to prevent the NAT firewall 16 from closing the UDP/IP heart beat channel 102 due to time out.

Figure 6:
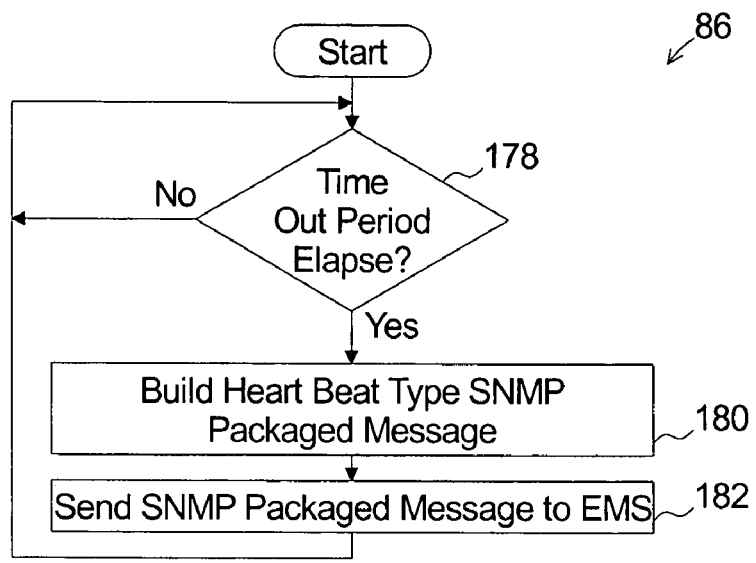
FIG. 6 is a flow chart representing exemplary operation of a heart beat module in accordance with one embodiment of the present invention.

Turning briefly to FIG. 6, exemplary operation of the heart beat module 86 is shown in flow chart form. Step 180 represents a timer loop set for the predetermined time period at which a heart beat frame is to be sent. When the timer has elapsed, a heart beat frame is built at step 180.

The heart beat message may be embodied as an SNMP Packaged Message 116 (FIG. 3) with the exception that there is no encrypted payload 128 and there is no sequence number 124. For purposes of the present invention, the message type 118 identifies the message as a heart beat message and identifies the managed device 18 by its device ID.

Step 182 represents sending the heart beat frame to the EMS 26 using the UDP/IP heart beat channel 102 (e.g. the destination socket includes the IP address of the EMS 26 and the destination port includes a heart beat listening port of the EMS 26; the source socket includes the IP address of the managed device 18 and a local socket assigned by the managed device 18 for the receipt of SNMP packaged messages 116 from the EMS 26).

Upon receipt of the heart beat frame, the EMS 26, or more particularly an SNMP message manager 54 of the EMS 26 records the UDP/IP heart beat channel 102 in a registration table 58. It should be appreciated that because the heart beat frame has been translated by the NAT 16, the heart beat channel 102 extracted from the heart beat frame comprises a source socket which includes the public IP address of the NAT 16 a local socket assigned by the NAT 16 to the translation of the heart beat frame and used by the NAT 16 as the source socket in sending the heart beat frame to the EMS 26.

The registration table 58 includes a plurality of records 59, each of which associates a managed device 18, identified by its device ID 37, to its then current UDP/IP heart beat channel 102 and the a proxy socket 45. The proxy socket 45 is dynamically assigned to the managed device 18, uniquely associated with the managed device 18, and used for: i) receiving SNMP messages from the NMS 30 which are to be directed to the managed device 18; and ii) sending SNMP Traps from the managed device 18 to the NMS 30.

At some point after the UDP/IP heart beat channel 102 is opened (and maintained as open by the heart beat module 86), it may be required that the NMS 30 send an SNMP message (such as an SNMP Get or an SNMP Set) to a managed device 18. Step 104 represent the NMS 30 sending an SNMP message to the proxy socket 45 of the EMS 26 that is associated with the managed device 18. This SNMP message may be referred to as the original request message.

In a typical SNMP architecture, an SNMP message is routed to the correct managed device simply by addressing the message within a UDP/IP frame to the managed device. However, because: i) all managed devices are managed though the EMS 26 in the present invention; and ii) the EMS 26 has only a limited number of assigned IP addresses (typically one), the managed device 18 to which the SNMP message is to be sent is identified by addressing the message to the proxy socket 45 that is uniquely associated with the managed device 18 in the registration table 58. This enables the EMS 26 to identify the intended managed device 18 by looking up the managed device 18 that uniquely associates with the proxy socket in the registration table 58.

To send an SNMP message to the correct proxy socket 45, the NMS 30 must maintain a managed devices table 34 which associates each managed device 18 (identified by its device ID 37) with the proxy socket 45 assigned by the EMS 26. Discovery of the proxy socket 45 assigned to each managed device 18 and development of such a managed table is discussed herein with respect to FIG. 13.

Further, in the typical SNMP architecture, an SNMP Response is associated with an SNMP Get by: i) the NMS sending the SNMP Get from a message specific socket 57 which includes a port number uniquely associated with the SNMP Get; and ii) the SNMP Response being returned to the same message specific socket 57. The NMS 30 uses such architecture. As such, the NMS 30 maintains a message table (not shown) which associates each SNMP Get with the message specific socket from which it was sent.

Following receipt of the original request message, the EMS 26 packages the original request message as encrypted payload 128 of an SNMP packaged message 116 (FIG. 3) for sending to the device SNMP gateway 84 over the heart beat channel 102.

More specifically, the EMS 26 queries the registration table 58: i) to determine the device ID 37 of the managed device 18 that is uniquely associated with proxy socket 45 on which the original request message was received from the NMS 30; and ii) to determine the heart beat channel 102 of the managed device 18.

To enable an SNMP Response to be associated with the original request message and returned to the NMS 30 at the correct message specific socket 57, the EMS 26: i) assigns a unique sequence number 124 to the original request message; and ii) writes a record to the message table 50 which associates the sequence number 124 with the device ID 37 of the managed device 18 and with identification of message specific socket 57 on which the original request message was received from the NMS 30.

The EMS 26 then encrypts the original request message as encrypted payload 128, builds the SNMP packaged message 116, and provides the SNMP packaged message 116 to the device SNMP gateway 84 over the heart beat channel 102 as represented by step 106.

Upon receipt of the SNMP packaged message 116, the device SNMP gateway 84 will: i) recover the original request message, ii) dynamically assign a local message specific port 99 for sending the original request message to the SNMP management object 88; iii) write a record 95 to a local response table 93 to associate the sequence number 124 with the local message specific port 99; and iv) send the original message to the SNMP management object 88 by packaging the original message as a UDP/IP frame sent from the local message specific port 99 to the well known port to which SNMP messages are customarily sent (e.g. port 161).

The local response table 93 includes a plurality of records 95. Each record 95 associates a sequence number 124 assigned to an original SNMP message with a local message specific port 99 used to send the original SNMP message to the SNMP management object 88.

Step 110 represents the SNMP management object 88 returning an SNMP Response to the device SNMP gateway 84. In accordance with known SNMP systems, the SNMP Response is returned to the local message specific port 99 from which the SNMP Get was sent.

In order to package the SNMP response as an SNMP packaged message 116 and to enable the EMS 26 to associate the SNMP response with the original request message, the device SNMP gateway 84 must recover the sequence number 124 of the original request message from the local response table 93. More specifically, the device SNMP gateway 84 looks up the sequence number 124 associated with the local message specific port 99 on which the SNMP Response was received from the managed object 88.

The device SNMP gateway 84 then builds an SNMP packaged message 116 with the SNMP Response as encrypted payload 128 and forward the SNMP packaged message 116 to the EMS 26 over the heart beat channel 102 at step 112.

The EMS 26, or more specifically, the SNMP message manager 54 de-packages and decrypts the payload 128 of the SNMP packaged message 116 to recover the SNMP Response. The SNMP message manager 54 further looks up the message specific socket 57 associated with the sequence number 124 in the message table 50 and sends the SNMP Response to the NMS 30 using the message specific socket 57.

It should be appreciated that upon receipt of the SNMP Response on the message specific socket 57, the NMS 30 can associate the SNMP Response with the original request message even in the absence of identification of the managed device 18 and in the absence of any sequence number.

HTTP and Telnet

Returning to FIG. 1 and FIG. 2, the user interface workstation 28 comprises an EMS client application 42, a browser 44, and a Telnet client 46 which, in combination with the EMS 26, enable an operator to configure a managed device 18 using a Telnet session or an HTTP session independent of whether the managed device 18 is coupled to a private network 14 and served by a NAT firewall 16. Each of the browser 44 and Telnet client 46 are known systems.

In operation, the EMS client application 42 provides a user interface screen to enable the user to identify a managed device 18 to which he or she desires to open a Telnet session or HTTP session. Upon obtaining user selection of the managed device 18 and the session type (e.g. selects whether the session is to be "Telnet" or "HTTP"), the session is established through the EMS 26 by implementing the steps of the ladder diagram shown in FIGS. 5a and 5b.

Figure 5A:
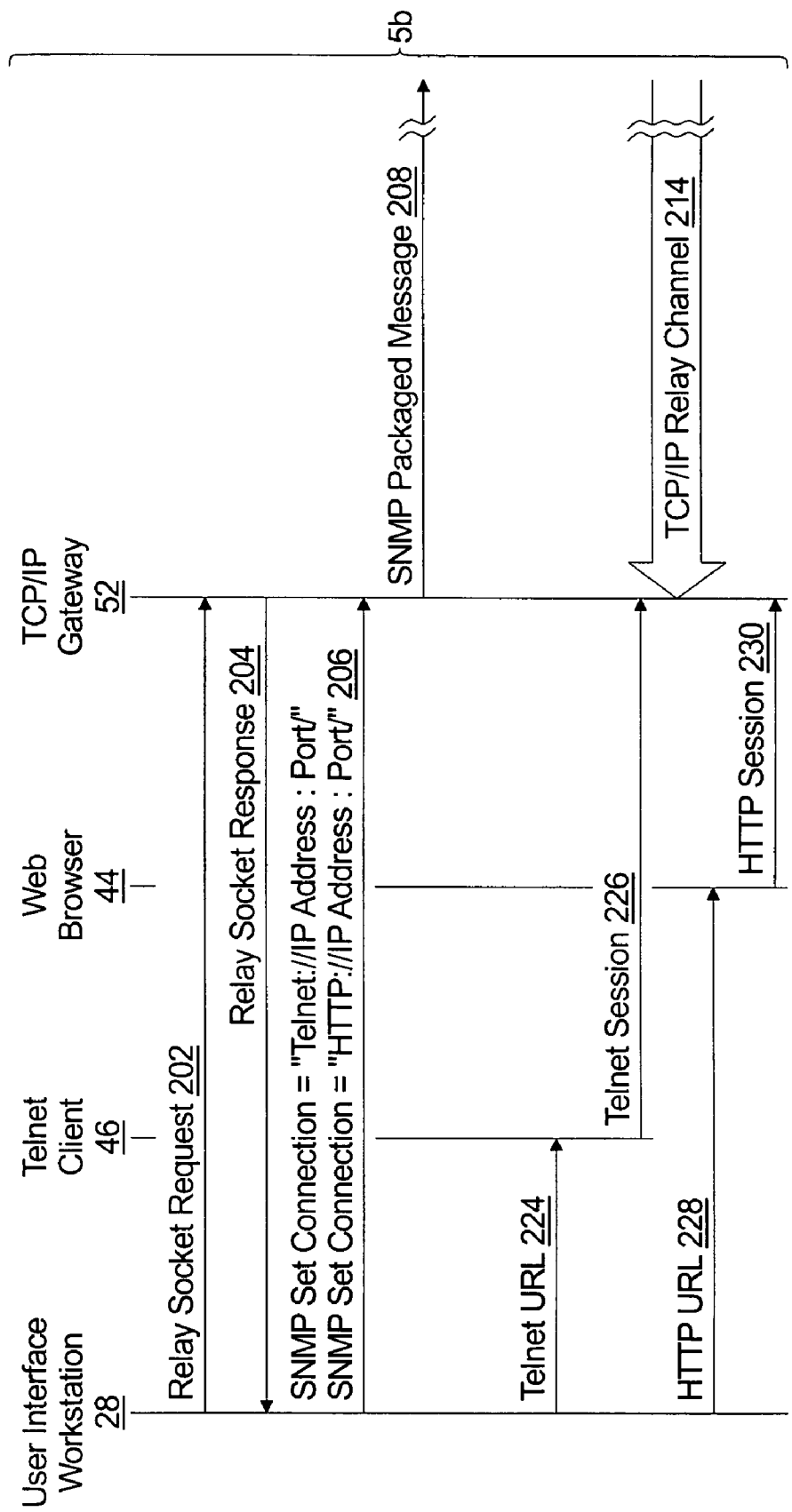
FIGS. 5a and 5b are a ladder diagram representing the exchange of messages to establish a Telnet session or an HTTP session with a managed device in accordance with one embodiment of the present invention.
Figure 5B:
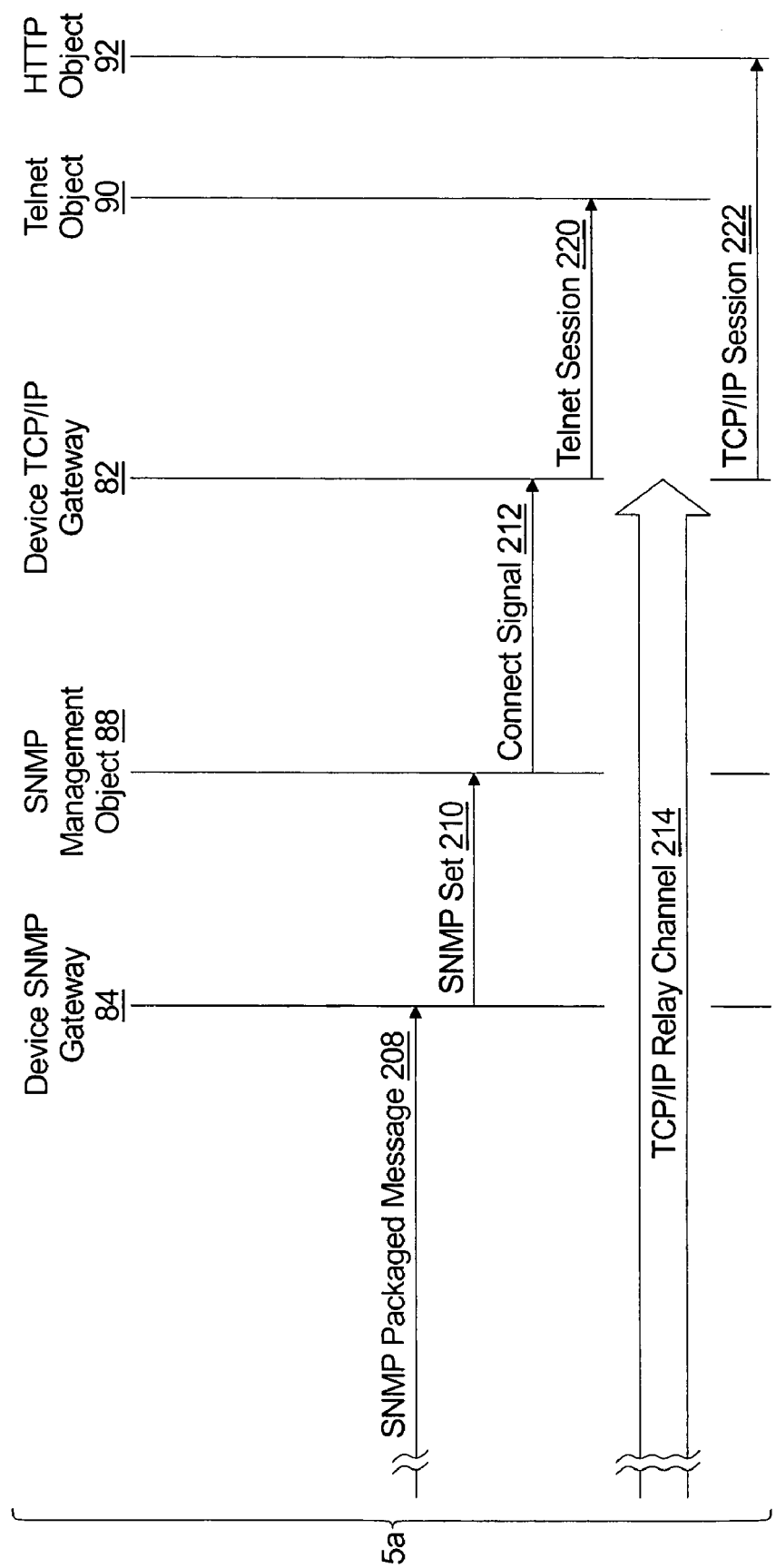

To facilitate discussion of the ladder diagram of FIGS. 5a and 5b, it is useful to first discuss general operation of each of the TCP/IP gateway 52 of the EMS 26 and the device TCP/IP gateway 82 of the managed device 18.

Referring to FIG. 8, the TCP/IP gateway 52 relays the TCP/IP connections of a Telnet session or an HTTP session(s) between the workstation 28 and the device TCP/IP gateway 82 within a managed device 18. The device TCP/IP gateway 82 relays the TCP/IP connections to the Telnet object 90 or the HTTP object 92 respectively.

To perform such operation, the TCP/IP gateway 52 assigns a first TCP/IP port number to which the device TCP/IP gateway 82 is to establish a TCP/IP connection (referred to as the relay connection 214) and a second TCP/IP port number to which the browser 44 or Telnet client 46 (not shown) is to establish a TCP/IP connection. For purposes of this description, the first assigned TCP/IP port is referred to as the relay port 211 and the second assigned TCP/IP port is referred to as the client port 213.

Similarly, the device TCP/IP gateway 82 assigns a first TCP/IP port number (referred to as relay port 215) which it utilizes to establish the relay TCP/IP connection to the TCP/IP gateway 52 and a second TCP/IP port number (referred to as object port 217) which the device TCP/IP gateway 82 utilizes to establish a TCP/IP connection to the Telnet object 90 (not shown) or the HTTP object 92. The example shown in FIG. 8 represents the relay of HTTP session(s) between the browser 44 and the HTTP object 92.

In general, the EMS client application 42 obtains the relay port number 211 and the client port number 213 from the TCP/IP gateway 52 using a relay socket request/relay socket response exchange. The EMS client application 42 then passes a URL identifying the relay socket 211 assigned by the TCP/IP gateway 52 by packaging the URL as a variable value of an SNMP Set (sent as encrypted payload of a SNMP packaged message sent to the SNMP message manger 54 of the managed device 18). The message type is a connection instruction. The SNMP message manager 54 de-packages and sends the SNMP Set to the SNMP management object 88 which in turn writes the URL to the MIB 34 in association with the variable ID 35 referred to as Connection. At the same time, the SNMP message manager 54 provides a connection signal to the device TCP/IP gateway 82.

Upon receipt of the connection signal, the device TCP/IP gateway obtains the connection URL from the MIB 34 and establishes the TCP/IP relay connection 214 to the URL.

Further, if the session is Telnet, the device TCP/IP gateway establishes a TCP/IP connection with the Telnet object 90. Or, if the session is HTTP, the device TCP/IP gateway establishes a TCP/IP connection with the HTTP object 92.

After each of the device TCP/IP gateway 82 and the browser 44 have established the TCP/IP connections to the assigned ports 211 and 213 of the TCP/IP gateway 52, relay of the sessions commences. The HTTP sessions between the client 44 and the HTTP object 90 may comprise a plurality of TCP/IP connections, each of which is: i) established between the TCP/IP gateway 52 and the browser 44 using known TCP/IP connection negotiations on a distinct socket utilizing the client port 213 of the TCP/IP gateway 52; ii) established between the device TCP/IP gateway 82 and the HTTP object 92 using known TCP/IP connection negotiations on a distinct socket utilizing the object port 217 of the device TCP/IP gateway 82; and iii) relayed between the TCP/IP gateway 52 and the device TCP/IP gateway 82 through the relay connection 214.

Turning to the ladder diagram of FIGS. 5a and 5b in combination with FIGS. 1, 2, and 8, step 202 represents the EMS client application 42 making a relay socket request to the TCP/IP gateway 52. Upon receiving the request, the TCP/IP gateway 52 assigns a relay port 211 and a client port 213 as discussed in more detail with respect to step 270 of the flow chart of FIG. 9.

Step 204 represents the TCP/IP gateway 52 providing the a relay response (identifying the relay port 211 and the client port 213) back to the EMS client application 42 as discussed with respect to step 274 of the flow chart of FIG. 9.

Step 206 represents the EMS client application 42 generating an SNMP Set which includes the URL identifying the relay port 211 (e.g. the connection type, IP address of the TCP/IP gateway 82, and the relay port 211) as the value 37 of a variable 35 with an object identifier called "Connection". The SNMP Set is a standard SNMP Set (and interpreted by the device SNMP gateway 84 as a connection instruction) which is sent to the proxy socket 45 of the EMS 26 which is uniquely associated with the managed device 18.

Upon receipt of the SNMP Set, the message is handled in accordance with the ladder diagram of FIG. 4 which results in the URL being associated with the variable 35 referred to as Connection in the MIB 34. More specifically: i) the SNMP Set is packaged as part of an SNMP packaged message 116 and forwarded to the Device SNMP Gateway 84 though the heart beat channel 102 at step 208; and ii) the SNMP Set is recovered from the SNMP packaged message 116 and forwarded to the device SNMP object 88 at step 210.

The device SNMP object 88 executes the SNMP Set— which in this example includes writing the value of the URL to the MIB variable "Connect". Further, as discussed (will be discussed), the device SNMP object 88 interprets the SNMP Set as a connection instruction and includes an extension which, when the SNMP set command includes a value for the MIB variable "Connect", provides a connect signal to the device TCP/IP gateway 82 at step 212. The connection signal itself may be a UDP/IP message sent to the device TCP/IP gateway 82, a processing call to the device TCP/IP gateway 82, or other technology for the exchange of a signal between two objects operating on the same system.

The device TCP/IP gateway 82 then reads the MIB variable "Connect" and establishes a TCP/IP relay session 214 to the specified URL. Further: i) if the URL is a Telnet URL, the TCP/IP gateway 82 establishes a Telnet session 220 with the Telnet object 90; and ii) if the URL is a hypertext transport protocol URL, establishes an HTTP session 222 with the HTTP object 92. The Telnet session 220 or the HTTP session 222 is relayed through the TCP/IP relay session 214.

The EMS client application 42 further performs steps 224 though 230. More specifically, if the session is a Telnet session, the EMS client application 42 spawns a Telnet client 46 and provides the Telnet URL to the spawned client at step 224. In turn, the Telnet client 46 establishes a Telnet session 226 thereto and the Telnet session 226 is relayed through the TCP/IP relay session 214.

Similarly, if the session is an HTTP session the EMS client application 42 spawns a web browser 46 and provides the HTTP URL to the spawned web browser 46 at step 228. In turn, the web browser 46 establishes an HTTP session 230 thereto and the HTTP session 230 is relayed through the TCP/IP relay session 214.

TCP/IP Gateway

The flow charts of FIGS. 9, 10a, 10b, 10c, and 11 represent exemplary operation of the TCP/IP gateway 52. More specifically, the flow chart of FIG. 9 represents exemplary steps performs by the TCP/IP gateway to assign a relay port 211 and a client port 213 (collectively referred to as resources) and accept the TCP/IP connections established by the client 44,46 and the device TCP/IP gateway 82.

Figure 7:
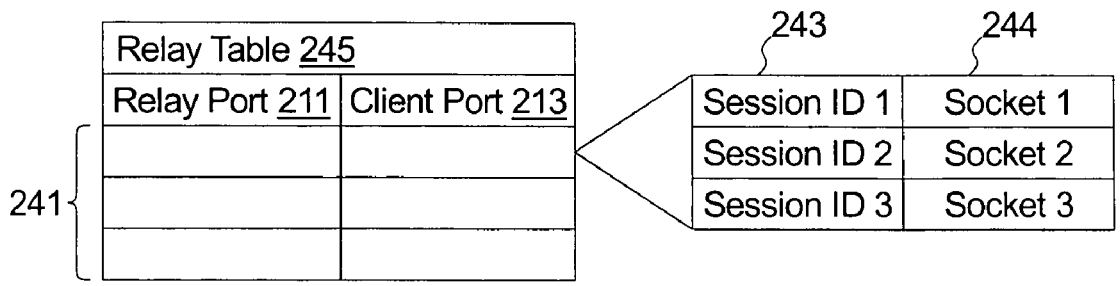
FIG. 7 is a diagram representing an exemplary relay table useful in operating a TCP/IP gateway in accordance with one embodiment of the present invention.

Referring to FIG. 9 in conjunction with FIG. 8, upon receipt of a relay socket request from the EMS client application 42 of the work station 28, the gateway 52 will assign the resources at step 270 and record the assigned resources in a relay table 245. Turning briefly to FIG. 7 in conjunction with FIG. 8, the relay table 245 comprises a plurality of records 241. Each record associates the relay port number 211 with the client port number 213 assigned for relay of a Telnet session or an HTTP session Further, as additional sockets are opened between the gateway 52 and the browser 44 (for example), the relay table associates each socket 244 with a session ID value 243.

Returning to FIG. 9 in conjunction with FIG. 8, step 274 represents returning the assigned resources to the EMS client application 42 as a resource response. After returning the resource response, the gateway 52 waits for each of the device TCP/IP gateway 82 and the client (the browser 44 in this example) to establish the initial TCP/IP connections to the assigned resources. Waiting for the device TCP/IP gateway 82 is represented by flow chart box 276a and waiting for the browser 44 is represented by flow chart box 276b.

After both initial connections are established, as determined at decision box 278, session relay commences at step 280. Session relay comprises: i) opening additional TCP/IP connections established by the browser 44; ii) initiate additional connections to the browser 44 in response to receipt of a start session data frame sent to the gateway 52 through the relay connection (upon initiation of an additional connection by the HTTP object 92 to the device TCP/IP gateway 82); iii) closing TCP/IP connections with the browser 44 in response to the browser 44 terminating a connection; iv) closing TCP/IP connections with the browser in response to receipt of an end session data frame sent to the gateway 52 through the relay connection; v) packaging all data packets received from the web browser 44 for relay to the device TCP/IP gateway 82 through the relay connection 214; and vi) de-packaging all packaged frames received from the TCP/IP gateway 82 and relaying the data packets contained therein to the browser 44 on the applicable socket.

Figure 10:
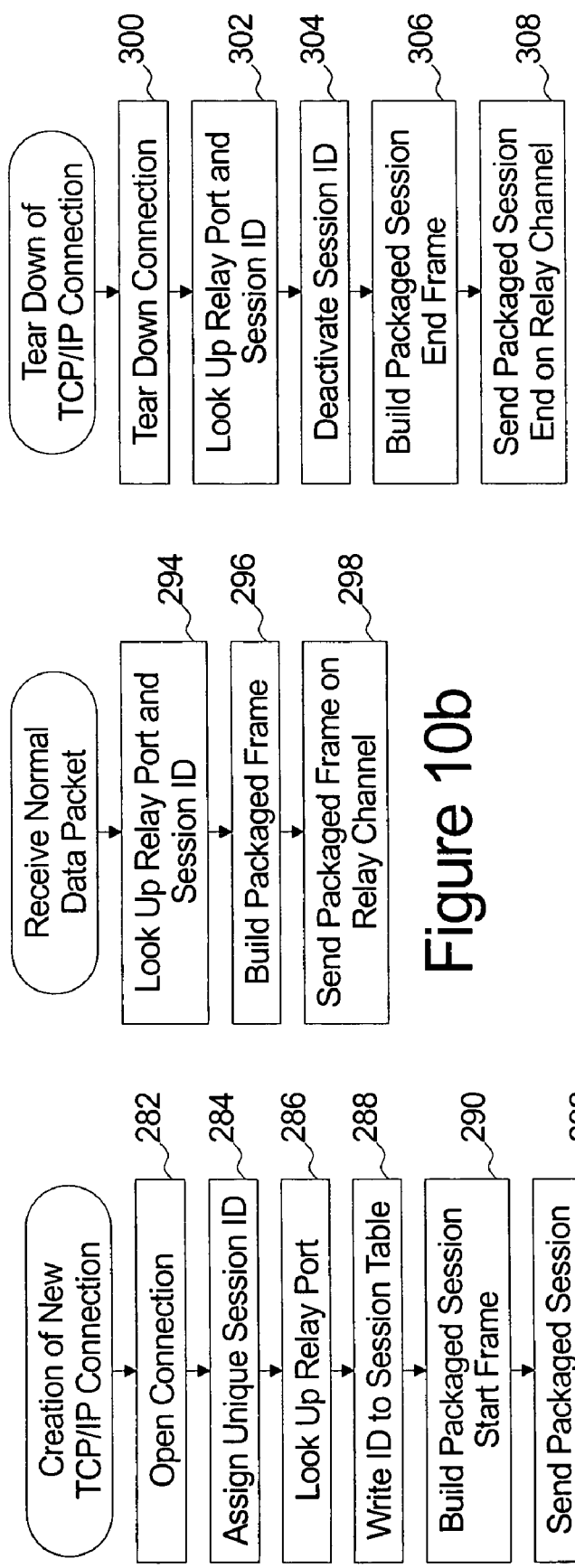
FIGS. 10a, 10b, and 10c are each flow charts representing exemplary operation of a TCP/IP gateway in accordance with one embodiment of the present invention.

The flow chart of FIG. 10a represents exemplary steps preformed by the gateway 52 upon the browser 44 initiating a new TCP/IP connection to the gateway 52. Step 282 represents opening the new TCP/IP connection with the browser 44 and step 284 represents assigning a unique session ID to the new connection.

Step 286 represents looking up (in the relay table 245 of FIG. 11) the relay port 211 which corresponds to the client port 213 on which the new connection is opened. Step 288 represents recording the socket of the new connection in combination with the session ID in the relay table 245—in association with the record 241 which associates the relay port 211 with the client port 213.

Step 290 represents building a packaged start session frame for relay to the device TCP/IP gateway 82 over the relay connection 214 at step 292. In the exemplary embodiment, the packaged start session frame comprises a message to the device TCP/IP gateway 82 indicating that the device TCP/IP gateway should initiate a new TCP/IP connection to the HTTP object 90 and associate the new connection with the session ID. The message may be encrypted in payload and the session ID included in a header.

The flow chart of FIG. 10b represents exemplary steps preformed by the gateway 52 upon receipt of a normal data packet from the browser 44. Step 294 represents looking up (in the relay table 245 of FIG. 7) both: i) the relay port 211 which corresponds to the client port 213 on which the data packet was received; and ii) the session ID which corresponds to the socket on which the data packet was received.

Step 296 represents building a packaged frame for relay to the device TCP/IP gateway 82 over the relay connection 214 at step 298.

The flow chart of FIG. 10c represents exemplary steps preformed by the gateway 52 upon tear down of a TCP/IP connection initiated by the browser 44. Step 300 represents tearing down the TCP/IP connection.

Step 302 represents looking up (in the relay table 245 of FIG. 11) both: i) the relay port 211 which corresponds to the client port 213 on which the connection existed; and ii) the session ID which corresponds to the socket on which connection existed.

Step 304 represents deactivating the session ID/socket combination in the relay table 245.

Step 306 represents building a packaged session end frame for relay to the device TCP/IP gateway 82 over the relay connection 214 at step 308. The packaged session end frame comprises a message to the device TCP/IP gateway 82 indicating that the device TCP/IP gateway should tear down the TCP/IP connection to the HTTP object 90 that is associated with the session ID. The message may be encrypted in payload and the session ID included in a header.

Figure 11:
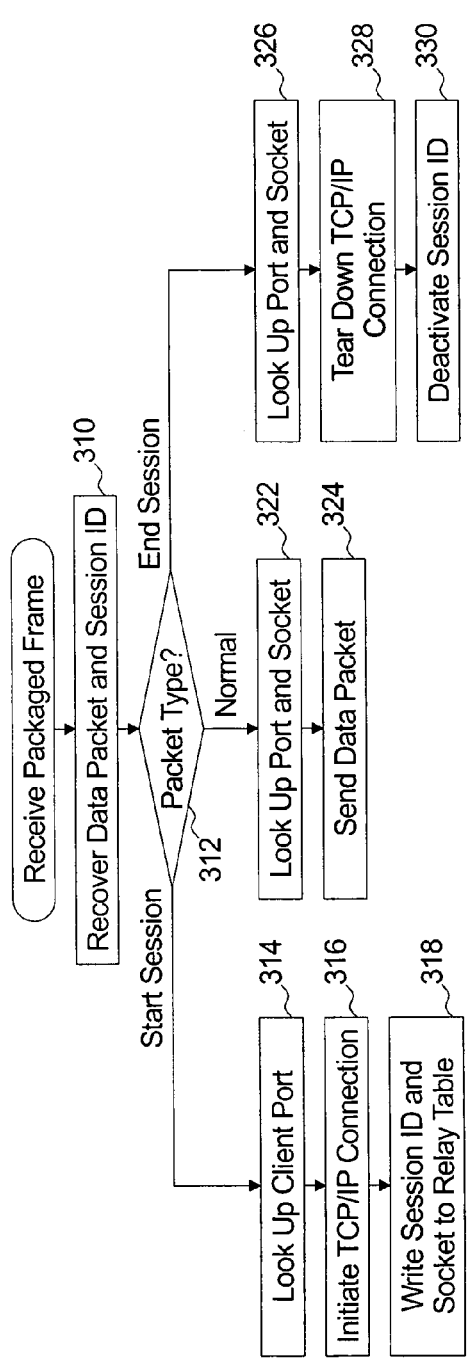
FIG. 11 is a flow chart representing exemplary operation of a TCP/IP gateway in accordance with one embodiment of the present invention.

The flow chart of FIG. 11 represents exemplary steps for the relay of packaged frames received over the relay channel 214 from the device TCP/IP gateway 82. Step 310 represents recovering the data packet encrypted within the payload of the packaged frame and recovering the session ID from the header of the packaged frame.

Decision box 312 represents determineing the packet type. The packet may be a start session data packet, and end session data packet, or a normal data packet initiated by the HTTP object 90.

If the packet is a start session data packet, steps 314 through 318 are performed. Step 314 represents looking up the client port 213 which corresponds to the relay port 211 on which the packaged frame was received. Step 316 represents initiating a new TCP/IP connection to the browser 44 and step 318 represents recording the socket of the new connection in combination with the session ID in the relay table 245—in association with the record 241 which associates the relay port 211 with the client port 213.

If the packet is a normal data packet, steps 322 and 324 are preformed. Step 322 represents looking up the client port 213 and the socket which corresponds to the relay port 211 on which the packaged frame was received and the session ID of the header of the packaged frame. Step 324 represents sending the data packet to the browser using such socket.

If the packet is an end session data packet, steps 326 through 330 are performed. Step 326 represents looking up the client port 213 and the socket which corresponds to the relay port 211 on which the packaged frame was received and the session ID of the header of the packaged frame. Step 328 represents tearing down the TCP/IP connection associated with the socket and step 330 represents deactivating the socket/session ID in the relay table 245.

Device TCP/IP Gateway

As discussed, the device TCP/IP gateway 82 relays a Telnet session or an HTTP session between the applicable one of the Telnet object 90 or the HTTP object 92 and the TCP/IP gateway 52 of the EMS 26 (which in turn relays the session to the applicable one of the Telnet client 46 or the browser 44 of the workstation 48).

The device TCP/IP gateway 82 must receive identification of the relay socket assigned by the TCP/IP gateway 52 for relay of the session (in the form of a URL), establish a TCP/IP connection to such relay socket (e.g the relay channel 214 of FIGS. 5a and 5b), and establish a TCP/IP session to the applicable one of the Telnet object 90 and the HTTP object 92. Such operation is represented by the Flow chart of FIG. 12.

In general, the EMS client application 42 passes the URL identifying the relay port 211 assigned by the TCP/IP gateway 52 by packaging the port 211 as a URL within a variable value of an SNMP Set (sent as encrypted payload of a SNMP packaged message sent to the SNMP message manger 54 of the managed device 18). The message type is a connection instruction. The SNMP message manager 54 de-packages and sends the SNMP Set to the SNMP management object 88 which in turn writes the URL to the MIB 34 in association with the variable ID 35 referred to as Connection. At the same time, the SNMP message manager 54 or the device SNMP object 88 provides a connection signal to the device TCP/IP gateway 82.

Figure 12:
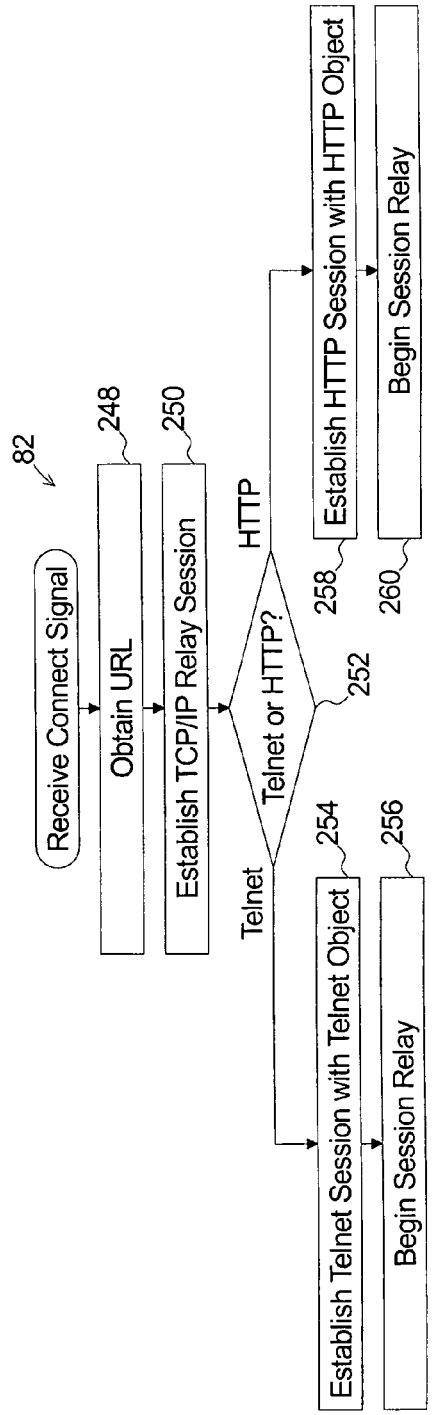
FIG. 12 is a flow chart representing exemplary operation of a device TCP/IP gateway in accordance with one embodiment of the present invention.

Upon receipt of the connection signal, the device TCP/IP gateway obtains the connection URL from the MIB 34 as represented by step 248 of the flow chart of FIG. 12 and establishes the TCP/IP relay connection 214 to the specified port 211 of the TCP/IP gateway 52 as represented by step 250.

At step 252, it is determined whether the URL specifies a Telnet session or HTTP session. If the session is Telnet, a first TCP/IP connection is established with the Telnet object 90 at step 254 and relay of the session is represented by step 256. If the session is HTTP, a first TCP/IP connection is established from a local port 217 assigned to the device TCP/IP gateway 82 to the HTTP object 92 at step 258 and relay of the session is represented by step 260.

Exemplary steps performed by the device TCP/IP gateway 82 to: i) establish additional TCP/IP connections to support a session; ii) tear down TCP/IP connections; and iii) relay data frames between the TCP/IP connections with the Telnet object 90 or the HTTP object 92 and the TCP/IP gateway 52 are similar to the steps performed by the TCP/IP gateway 52 as discussed with respect to FIGS. 10a, 10b, 10c, and 11. However, it should be appreciated that references in the discussion of such figures to the relay table 245 would refer to a relay table 245 of the device TCP/IP gateway and references to the client port 213 and the relay port 211 would refer to the local port 217 and the relay port 215 respectively.

NMS Discovery

Figure 13:
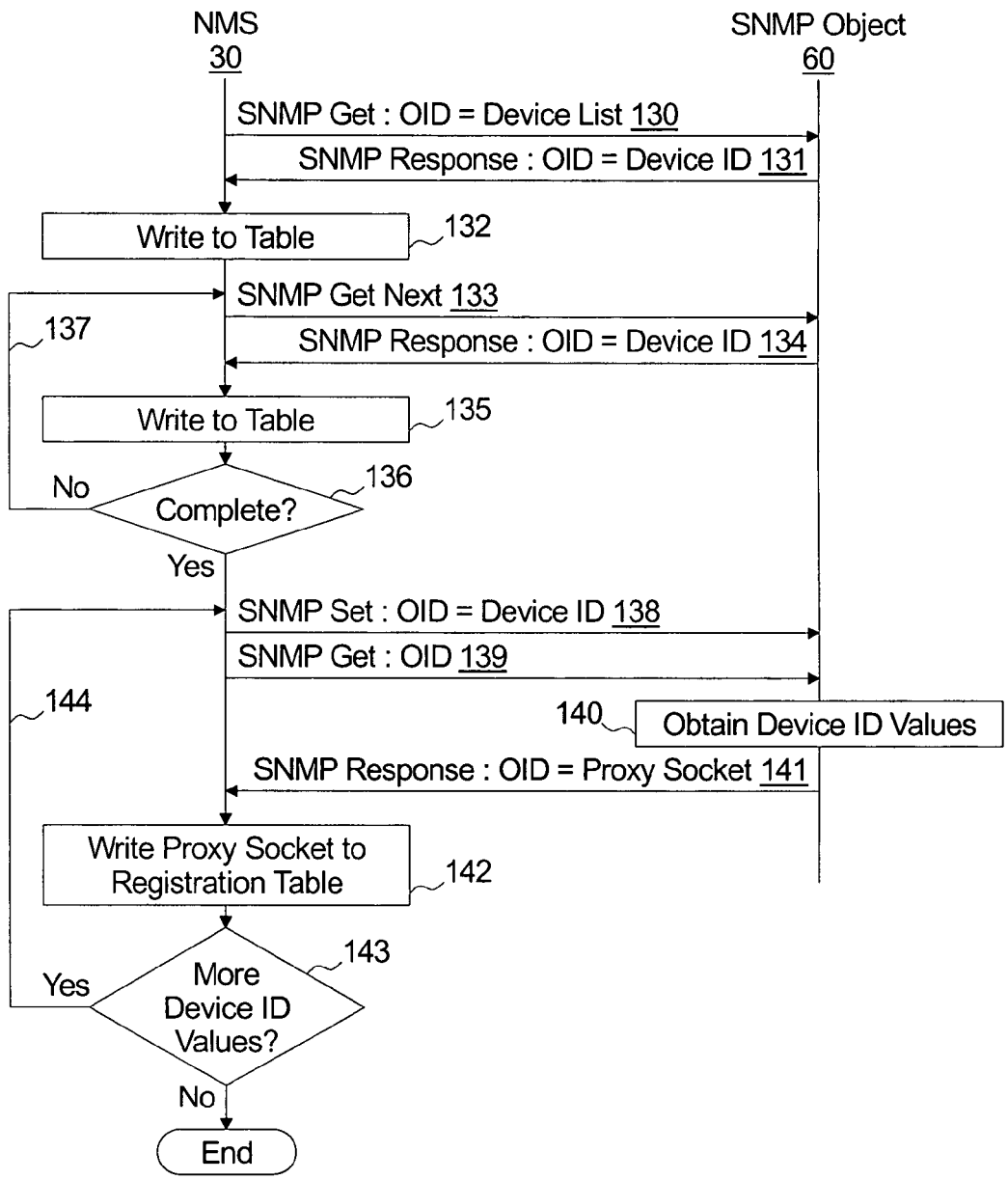
FIG. 13 is a flow chart representing exemplary operation of a network management server for discovering devices managed through an element management server in accordance with one embodiment of the present invention.

The ladder diagram of FIG. 13 represents steps performed by the NMS 30 and the SNMP object 60 (e.g. the SNMP Daemon) of the EMS 26 to "discover" managed devices 18 which are managed through the EMS 26 and to obtain the proxy socket 45 associated with each.

Steps 130 through 132 represents the NMS 30 obtaining the device ID 37 for each of a plurality of managed devices 18. More specifically, at step 130 the NMS 30 sends an SNMP Get to the SNMP object 60 of the EMS 26 with a variable named Object Identifier (OID) identifying the device list. The SNMP Get is sent to the IP address of the EMS 26 using the well known UDP port (port 161)—which assures local routing to the SNMP object 60. Step 131 represents the SNMP object 60 returning an SNMP response that includes a device ID of the first of the managed devices 18 as the variable value. At step 132 the NMS 30 writes the device ID to the managed devices table 34.

Step 133 then represents the NMS 30 sending an SNMP GetNext to the SNMP object 60 and, at step 134, the SNMP object 60 returns an SNMP Response that includes the device ID of the next managed device 18 as its variable value. Step 135 represents the NMS 30 writing the device ID value of such managed device 18 to the managed devices table 34.

This SNMP GetNext and SNMP Response process is repeated until a variable value is returned indicating that there or no more managed device ID values to return to the NMS 30. Decision box 136 and loop back 137 representing repeating the process.

After all device ID values are obtained and written to the managed devices table 34, the NMS 30 beings a process of determining the proxy socket 45 for each device.

More specifically, step 138 represent generating an SNMP Set to provide a value to the SNMP object 60 of the EMS 26. The value of the OID is the device ID 37 of the first one of the managed devices 18 in the managed devices table 34.

At step 139, the NMS 30 follows the SNMP Set with an SNMP Get to obtain a value for a variable named OID from the EMS 26.

Step 140 represents the SNMP object 60 looking up the proxy socket 45 that is associated with the device ID 37 (identified in the SNMP Set at step 138). Step 141 represents the SNMP object 160 sending an SNMP Response to the SNMP Get which includes the proxy socket 45 as the value for the variable named OID.

Step 142 represents the NMS 30 associating the device ID 37 and the proxy socket 45 in a record of the managed devices table 34.

Step 143 represents determining if there are more managed devices 18 in the managed devices table 34. If yes, steps 138 through 143 are again repeated for the next managed device 18 as represented by the feedback line 144.

The flow charts of FIGS. 14, 15, 16, 17, and 18 represent a more detailed operation of the SNMP message manager 54 and the device SNMP gateway 84 in the exchange of SNMP packaged messages.

Figure 14:
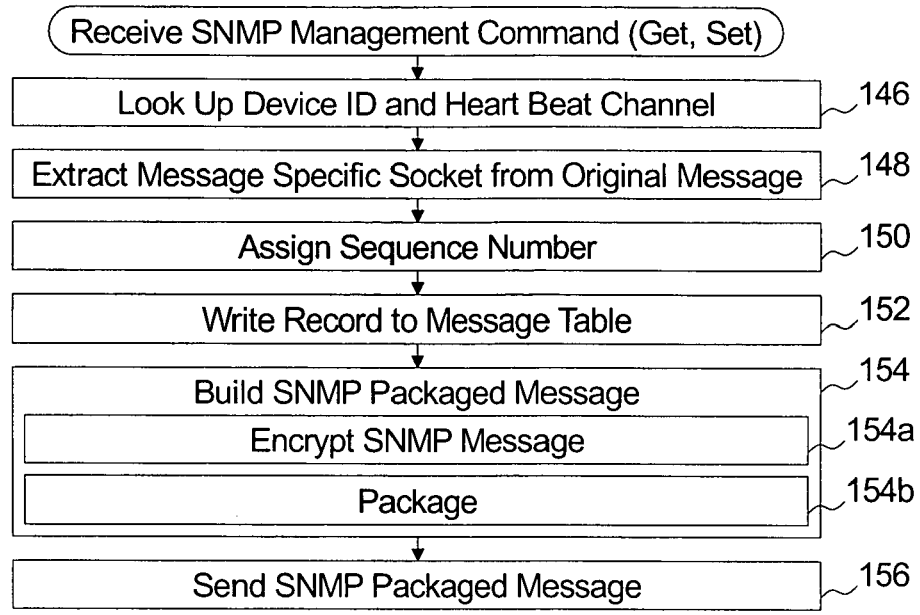
FIG. 14 is a flow chart representing exemplary operation of an SNMP message manager in accordance with one embodiment of the present invention.

More specifically, the flow chart of FIG. 14 represents exemplary operation of the SNMP message manager 54 when an SNMP Get or an SNMP Set (e.g. and SNMP original message) is received on one of the proxy sockets 45 assigned to one of the managed devices 18. As previously discussed, SNMP messages are sent as UDP/IP frames addressed to a particular managed device and therefore do not include identification of the managed device within the message. As such, a proxy socket 45 of the EMS 26 is uniquely associated with each managed device 18 such that the destination managed device 18 (and its heart beat channel) may be identified by looking up, in the registration table 58, the device ID 37 and heart beat channel 102 which correspond to the proxy socket 45 on which the SNMP message from the was received from the NMS 30. Step 146 represents performing such a look up.

Step 148 represents extracting the message specific socket 57 (e.g. the source socket used by the NMS 30 to send the SNMP message) from the SNMP original message, step 150 represents assigning a unique sequence number 124 to the message, and step 152 represents recording the message specific socket 57 in association with the sequence number 124 in the message table 50.

Step 154 represents building an SNMP packaged message 116 (FIG. 3) that includes the SNMP message as encrypted payload 128. More specifically, sub step 154*a* represents encrypting the original SNMP message and step 154*b* represents packaging the message with the headers to create the SNMP packaged message 116.

It should be appreciated that encryption protects the privacy of the message when transmitted over the Internet 12. But with all encryption systems, the key management becomes more cumbersome in the most secure systems. It is envisioned in the present invention that adequate security will be achieved if all SNMP packaged message 116 exchanged between the EMS 26 and any managed device using the same encryption key.

After the SNMP packaged message is built, it is sent to the managed device 18 over the heart beat channel 102 at step 156.

Figure 15:
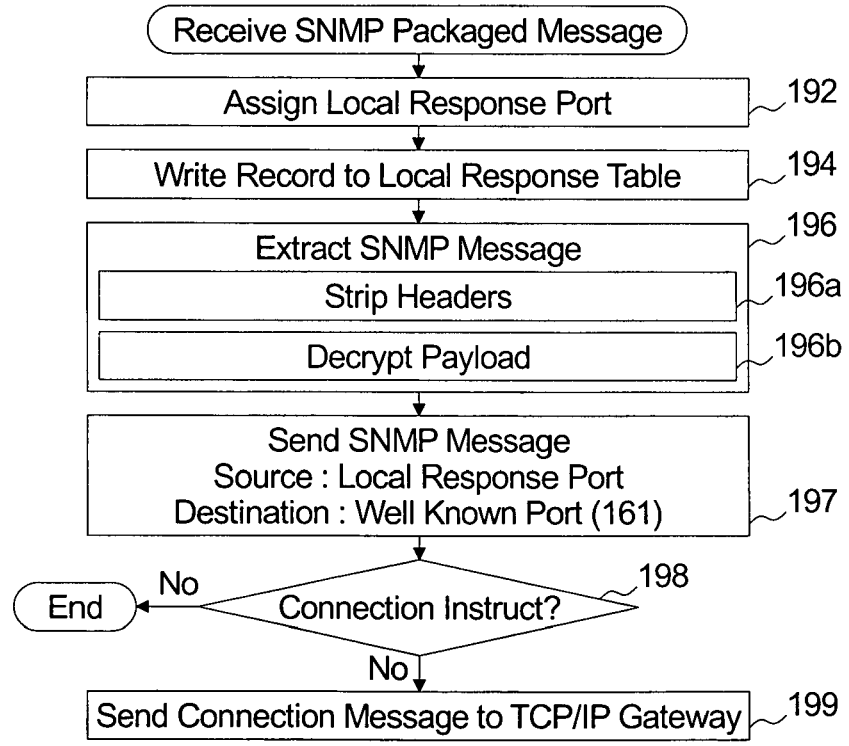
FIG. 15 is a flow chart representing exemplary operation of a device SNMP gateway in accordance with one embodiment of the present invention.

The flow chart of FIG. 15 represents exemplary operation of the device SNMP gateway 84 in response to receiving an SNMP packaged message 116 on the UDP/IP heart beat channel 102 from the EMS 26.

In general, the device SNMP gateway 84 will recover the original SNMP message and forward it to the SNMP management object 88. If an SNMP packaged message 116 (FIG. 3) received from the EMS 16 includes a connection instruction, the device SNMP will not only recover the recover the original SNMP message and forward it to the SNMP management object 88, but it will also provide a connection signal to the device TCP/IP gateway 82 indicating that the device TCP/IP gateway 82 is to establish a TCP/IP connection for supporting either a Telnet session or an HTTP session.

As discussed, known SNMP technology comprises addressing an SNMP Get directly to the managed device (with no device identification within the message) and returning a response on the same message specific socket 57 from which the SNMP Get was sent (again with no device identification or response identification within the message). As such, the device SNMP gateway 82 will assign a local message specific port 99 for forwarding the SNMP message to the management object 88 such that a response from the SNMP management object 88 will be on the same local message specific port 99 and readily associated with the SNMP message.

The device SNMP gateway 86 associates the sequence number 124 of the SNMP message with the local message specific port 99 in the local response table 93 such that an SNMP response message may be forwarded back to the EMS 26 with the same sequence number 124 as the SNMP Get message to which it is responding.

Step 192 represents assigning a local message specific port 99 to the message and step 194 represents writing a record to the local response table 93 to associate the local message specific port 99 with the sequence number 124 assigned to the message.

Step 196 represents extracting the SNMP message from the encrypted payload 128 by stripping the headers at sub step 196a and decrypting the payload 128 at step 196b.

Step 197 represent sending the original SNMP message to the SNMP management object 88 using the IP address of the managed device 18 and the well known port for SNMP messages (e.g. port 161) as the destination socket and using the IP address of the managed device and the local message specific port 99 as the source socket.

Step 198 represents determining whether the message type 118 (from the headers) is a connection message. If not, no more steps are performed. If the message type 118 is a connection message, the connection instruction is passed to the device TCP/IP gateway 52.

Figure 16:
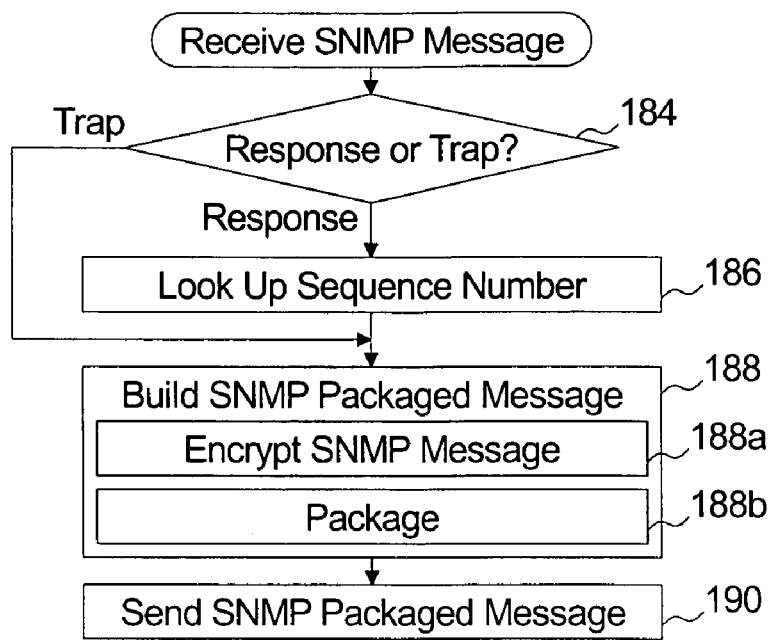
FIG. 16 is a flow chart representing exemplary operation of a device SNMP gateway in accordance with one embodiment of the present invention.

The flow chart of FIG. 16 represents exemplary operation of the device SNMP gateway 84 in response to receiving an SNMP message from the device SNMP object 88.

The SNMP management object 88 may send an SNMP Response in response to an original SNMP Get sent thereto or it may sent an SNMP Asynchronous Trap. If the message is an SNMP Response, it will be sent to the same local message specific port 99 on which the original message was sent by the device SNMP gateway 82. If the message is an SNMP Trap, it will be sent to the well known UDP/IP port to which Traps are sent (e.g. port 162). Step 184 represents determining whether the message is an SNMP Response or an SNMP Trap.

If the message is an SNMP Response, the sequence number 124 of the original message is determined at step 186 by looking up the sequence number 124 that corresponds to the local message specific port 99 in the local response table 93.

Independent of whether the message is an SNMP Response or an SNMP Trap, steps 188 and 190 represent building an SNMP packaged message 116 and sending the SNMP packaged message 116 to the EMS 26. More specifically, step 188 represents building the SNMP packaged message 116 by encrypting the SNMP message (sub step 188a) and packaging the message by building the applicable headers (sub step 188b). The SNMP Trap will not include a sequence number.

Step 190 represents sending the SNMP packaged message 116 to the EMS 26 over the UDP/IP heart beat channel 102.

Figure 17:
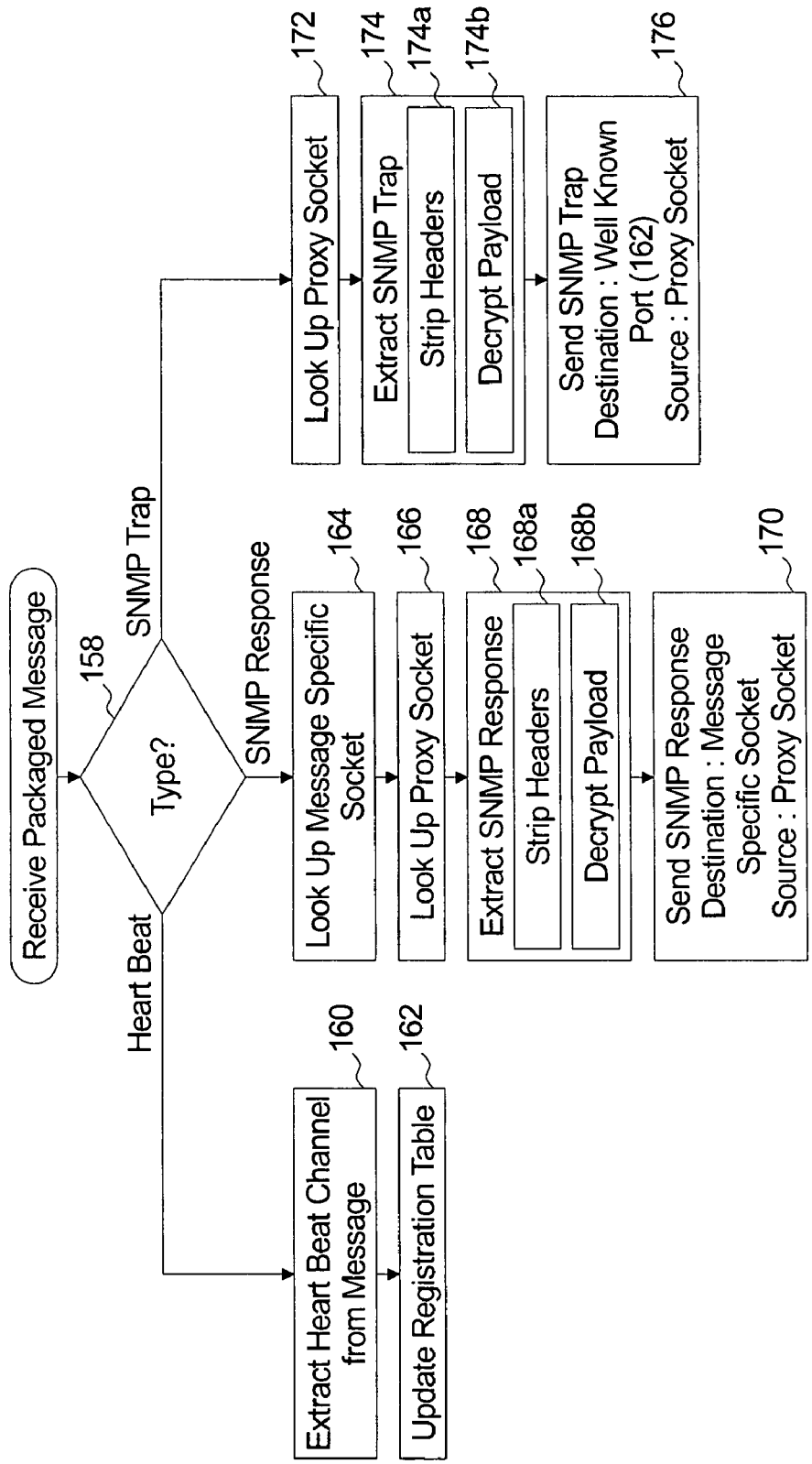
FIG. 17 is a flow chart representing exemplary operation of an SNMP message manager in accordance with one embodiment of the present invention.

The flow chart of FIG. 17 represents exemplary processing steps performed by the SNMP message manager 54 of the EMS 26 upon receipt of an SNMP packaged message 116 from a managed device 18. The SNMP packaged message 116 may be any of a heart beat message, an SNMP Response to an original SNMP Get previously sent to the managed device 18, or an SNMP Trap.

If the message is a heart beat message, the UDP/IP heart beat channel 102 is extracted from the message at step 160 and the registration table 58 is updated to assure that the extracted UDP/IP heart beat channel 102 is associated with the device ID 37.

If the message includes an SNMP Trap, the SNMP Trap must be sent to the well known port of the NMS 30 and sent from the proxy socket 45 that is associated with the managed device 18. Step 172 represents looking up the proxy socket 45 uniquely associated with the managed device 18 from the registration table 58.

Step 174 represents extracting the SNMP Trap from the SNMP packaged message 116 by stripping the headers (sub step 174a) and decrypting the payload (sub step 174b).

Step 176 represents sending the SNMP Trap to the NMS 30 in a UDP/IP frame with a source socket being the proxy socket 45 and the destination socket being the IP address of the NMS 30 and the well known port to which SNMP Traps are sent.

If the SNMP packaged message includes an SNMP Response, the SNMP Response must be sent to the NMS 30 using the message specific socket 57 associated with the original SNMP Get. Step 164 represents looking up the message specific socket 57 which corresponds to the sequence number 124 in the message table 50 and step 166 represents looking up the proxy socket 45 assigned to the managed device in the registration table 58.

Step 168 represents extracting the SNMP Response from the SNMP packaged message 116 by stripping the headers (sub step 168a) and decrypting the payload (sub step 168b).

Step 170 represents sending the SNMP response to the NMS 30 as a UDP/IP frame with a source socket being the proxy socket 45 and the destination socket being the message specific socket 57.

EMS Client Application

Figure 18:
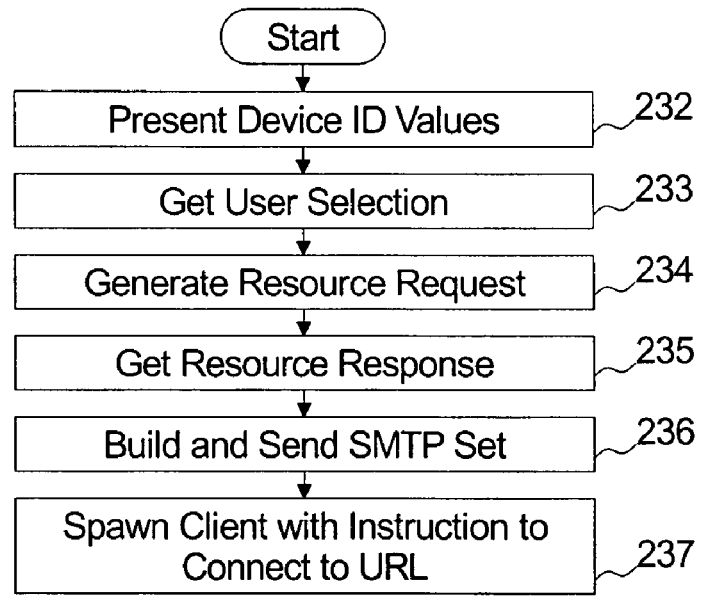
FIG. 18 is a flow chart representing exemplary operation of an element management server client application of a work station in accordance with one embodiment of the present invention.

The flow chart of FIG. 18 represents exemplary operation of the EMS client application 42 for enabling an operator to select a managed device 18 and establish a Telnet or HTTP connection thereto.

Step 232 represents presenting the device ID values for each managed device 18 in a user interface on the workstation 28 for operator selection and step 233 represents receive the user's indication of a managed device 18 to which he or she desires to establish one of a Telnet session or HTTP session.

Step 234 represents generating a resource request to the TCP/IP gateway 52 and step 235 represents receiving a relay port and a client port as part of a resource response—as previously discussed with respect to FIGS. 5a and 5b.

After receiving the relay response, the EMS client application 42, at step 236: i) generates an SNMP Set identifying the relay port as part of a URL—which is a value of the variable named Connection; and ii) addresses the SNMP Set as a UDP/IP frame to the proxy socket 45 associated with the managed device 18. It should be appreciated that the EMS client application 42 can obtain the proxy socket for each managed device by performing the steps of the ladder diagram of FIG. 13 as previously discussed with respect to the NMS 30.

Step 237 represents the EMS client application 42 spawning a browser 44 or a Telnet client 46 with an instruction to the spawned client to establish a connection to a URL that includes the client port.

SUMMARY

In summary, it should be appreciated that the systems and methods of the present invention enable monitoring and management of a plurality of clients by a traditional SNMP network management server even when a plurality of the managed clients are located on private networks and are served by a network address and port translation firewall. Further, the systems and method of the present invention enable a workstation operating a Telnet or HTTP client to configure a plurality of the managed clients located on private networks.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An element management system for enabling a network management server to provide a variable value to a management information base of a managed device independent of whether the managed device is coupled to a private network and served by a network address translation firewall, the system comprising:
   a network interface system enabling the exchange of IP frames between each of the network management server and a public network interface of the network address translation firewall; and
   an SNMP message manager:
      receiving periodic heart beat frames on a heart beat channel, each heart beat frame being initiated by the managed device and translated by the network address translating firewall, the heart beat channel comprising a translated source socket and a destination socket of the heart beat frame;
      storing identification of the heart beat channel in association with identification of the managed device in a registration table;
      uniquely associating an assigned UDP port of the element management system with the managed device;
      providing the unique association of the assigned UDP port and the managed device to the network management server;
      receiving an SNMP Set from the network management server embodied as an IP frame addressed to the assigned UDP port; and
sending the SNMP Set to the managed device using the heartbeat channel;
   wherein the SNMP message manager further provides for:
      receiving an SNMP Get from the network management server embodied as an IP frame addressed to the assigned UDP port;
      assigning a unique sequence number to the SNMP Get and recording the unique sequence number in a message table: i) in association with identification of the managed device associated with the assigned UDP port to which the SNMP Get was addressed; and ii) in association with the source socket of the network management server from which the SNMP Get was sent; and
      sending the SNMP Get in combination with the unique sequence number to the managed device using the heartbeat channel;
      receiving an SNMP Response in combination with the sequence number;
      obtaining the source socket of the network management server corresponding to the sequence number in the message table; and
      sending the SNMP Response to the source socket of the network management server.

2. The element management system of claim 1, wherein:
   the element management system sends the SNMP Get in combination with the unique sequence number as an SNMP packaged message, the SNMP packaged message comprising the SNMP Get as encrypted payload and the unique sequence number as a header; and
   SNMP Response is embodiment in an SNMP packaged message, the SNMP packaged message comprising the SNMP Response as encrypted payload and the sequence number as a header.

3. An element management system for enabling a network management server to provide a variable value to a management information base of a managed device independent of whether the managed device is coupled to a private network and served by a network address translation firewall, the system comprising:
   a network interface system enabling the exchange of IP frames between each of the network management server and a public network interface of the network address translation firewall; and
   an SNMP message manager:
      receiving periodic heart beat frames on a heart beat channel, each heart beat frame being initiated by the managed device and translated by the network address translating firewall, the heart beat channel comprising a translated source socket and a destination socket of the heart beat frame;
      storing identification of the heart beat channel in association with identification of the managed device in a registration table;
      uniquely associating an assigned UDP port of the element management system with the managed device;
      providing the unique association of the assigned UDP port and the managed device to the network management server;
      receiving an SNMP Set from the network management server embodied as an IP frame addressed to the assigned UDP port; and
sending the SNMP Set to the managed device using the heartbeat channel;
   further comprising:
   a TCP/IP gateway for enabling a first client to establish a session to an object server of the managed device, the TCP/IP gateway:
      uniquely associating a client port with a relay port;
      identifying the relay port to the element management system;
      establishing a relay connection with the managed device upon initiation of the connection by the managed device through the network address translation firewall;
      establishing a first client connection with the first client upon initiation of the connection from the first client on a first socket that comprises the client port;
      relaying data packets between the first client connection and the managed device through the relay connection; and
   wherein, the element management system further provides for receiving identification of the relay port from the TCP/IP gateway and providing the relay port to the managed device using the heart beat channel; and
wherein:
   the element managements system provides the relay port to the managed device using the heart beat channel by:
      embodying the identification of the relay port within an SNMP Set;
      sending the SNMP Get to the device SNMP gateway using the heartbeat channel; and
   the message handling module of the device SNMP gateway further provides for:
      receiving the SNMP Set;
      sending the SNMP Set to the SNMP object;
   the SNMP object further provides for:
      writing the identification of the relay port to the management information base; and
   the object server obtains identification of the relay port from the management information base and establishes the relay connection the TCP/IP gateway using the relay port.

4. An element management system for enabling a network management server to provide a variable value to a management information base of a managed device independent of whether the managed device is coupled to a private network and served by a network address translation firewall, the system comprising:
- a network interface system enabling the exchange of IP frames between each of the network management server and a public network interface of the network address translation firewall; and
- an SNMP message manager:
  - receiving periodic heart beat frames on a heart beat channel, each heart beat frame being initiated by the managed device and translated by the network address translating firewall, the heart beat channel comprising a translated source socket and a destination socket of the heart beet frame;
  - storing identification of the heart beat channel in association with identification of the managed device in a registration table;
  - uniquely associating an assigned UDP port of the element management system with the managed device;
  - providing the unique association of the assigned UDP port and the managed device to the network management server;
  - receiving an SNMP Set from the network management server embodied as an IP frame addressed to the assigned UDP port; and sending the SNMP Set to the managed device using the heartbeat channel;
  further comprising a TCP/IP gateway for enabling a first client to establish a session to an object server of the managed device, the TCP/IP gateway;
  uniquely associating a client port with a relay port;
  identifying the relay port to the element management system;
  establishing a relay connection with the managed device upon initiation of the connection by the managed device through the network address translation firewall;
  establishing a first client connection with the first client upon initiation of the connection from the first client on a first socket that comprises the client port;
  relaying data packets between the first client connection and the managed device through the relay connection; and
wherein, the element management system further provides for receiving identification of the relay port from the TCP/IP gateway and providing the relay port to the managed device using the heart beat channel;
wherein relaying data packets between the first client connection and the managed device comprises;
  with respect to data packets being sent from the first client to the object server:
    receiving a data packet on a client socket from the client;
    looking up: i) a session ID number that is uniquely associated with the client; and ii) the relay connection that is uniquely associated with the client port of the client socket in a relay table;
    building packaged frame comprising the session number and an encrypted representation of the data packet;
    sending the packaged frame on the relay connection; and
  with respect to data packets being sent form the object server to the first client:
    receiving a packaged frame on the relay connection;
    recovering a session ID and the data packet from the packaged frame; and
    sending the data packet on the client socket that is uniquely associated with the session ID recovered from the packaged frame; and with respect to additional TCP/IP connections established by the first client:
    establishing a new TCP/IP connection upon initiation by the first client using a second client socket comprising the client port;
    assigning a unique session ID to the second client socket and associating the session ID to the second client socket in the relay table;
    sending a new session message and the session ID to the managed device using the relay connection that is associated with the client port;
  with respect to additional TCP/IP connections established by the server object:
    receiving a new session message and a session ID from the managed device on the relay connection;
    establishing a new TCP/IP connection to the first client using a second client socket comprising the client port; and
    associating the session ID with the second client socket in the relay table.

5. An element management system for enabling a network management server to provide a variable value to a management information base of a managed device independent of whether the managed device is coupled to a private network and served by a network address translation firewall, the system comprising:
- an SNMP message manager communicatively coupled to each of the network management server and a public network interface of the network address translation firewall; and
- a device SNMP gateway communicatively coupled to a private network interface of the network address translation firewall and communicatively coupled to an SNMP object;
- the SNMP object comprising systems for receiving art SNMP Set sent by the SNMP gateway to a predefined SNMP port number and writing a variable value within the SNMP set to the management information base;
- the SNMP message manager:
  - receiving periodic heart beat frames on a heart beat channel, each heart beat frame being initiated by the managed device and translated by the network address translating firewall, the heart beat channel comprising a translated source socket and a destination socket of the heart beat frame;
  - storing identification of the heart bet channel in association with identification of the managed device In a registration table;
  - uniquely associating an assigned UDP port of the element management system with the managed device;
  - providing the unique association of the assigned UDP port and the managed device to the network management server;
  - receiving an SNMP Set from the network management server embodied as an IP frame addressed to the assigned UDP port; and
  - sending the SNMP Set to the managed device using the heartbeat channel; and
- the device SNMP gateway comprising;
  - a heart beat module periodically sending a heart beat IP frame to a socket associated with the SNMP message manager to maintain the heart beat channel through the network address translation firewall; and
  - a message handling module:
    - receiving the SNMP Set;
    - sending the SNMP Set to the SNMP object as a UDP/IP message addressed to the predefined SNMP port number.

6. The element management system of claim 5, wherein:
the SNMP object further comprising systems for receiving an SNMP Get sent by the SNMP gateway to the predefined SNMP port number and returning an SNMP Response to the source socket from which the SNMP Get was sent;
the SNMP message manager further provides for:
receiving an SNMP Get from the network management server embodied as an IP frame addressed to the assigned UDP port;
assigning a unique sequence number to the SNMP Get and recording the unique sequence number in a message table: i) in association with identification of the managed device associated with the assigned UDP port on which the SNMP Get was received; and ii) in association with the source socket of the network management server from which the SNMP Get was sent; and
sending the SNMP Get in combination with the unique sequence number to the managed device using the heartbeat channel;
receiving an SNMP Response in combination with the sequence number;
obtaining the source socket of the network management server corresponding to the sequence number in the message table; and
sending the SNMP Response to the source socket of the network management server;
the device SNMP gateway further provides for:
receiving the SNMP get in combination with the unique sequence number;
assigning a message specific socket from which the device SNMP gateway sends the SNMP Get to the SNMP object and associating the message specific socket with the unique sequence number in a local response table;
sending the SNMP Get to the SNMP object from the message specific socket and receiving an SNMP Response addressed to the message specific socket from the SNMP object;
obtaining the sequence number associated with the message specific socket from the local response table; and
sending the SNMP Response in combination with the sequence number to the SNMP message manager.

7. The element management system of claim 6, wherein:
the SNMP message manager sends the SNMP Get in combination with the unique sequence number as an SNMP packaged message, the SNMP packaged message comprising the SNMP Get as encrypted payload and the unique sequence number as a header; and
SNMP Response is embodiment in an SNMP packaged message, the SNMP packaged message comprising the SNMP Response as encrypted payload and the sequence number as a header.

8. The element management system of claim 5, further comprising:
a TCP/IP gateway for enabling a first client to establish a session to an object server of the managed device, the TCP/IP gateway:
uniquely associating a client port with a relay port in a relay table;
identifying the relay port to the element management system;
establishing a relay connection with the managed device upon initiation of the connection by the managed device through the network address translation firewall;
establishing a first client connection with the first client upon initiation of the connection by the first client on a first socket That comprises the client port;
relaying data packets between the first client connection and the managed device through the relay connection; and
wherein, the element management system further provides for receiving identification of the relay port from the TCP/IP gateway and providing the relay port to the managed device using the heart beat channel.

9. The element management system of claim 8, wherein:
element management system provides the relay port to the managed device using the heart beat channel by:
embodying the identification of the relay port within an SNMP Set;
sending the SNMP Get to the device SNMP gateway using the heartbeat channel;
the message handling module of The device SNMP gateway further providing for:
receiving the SNMP Set;
sending the SNMP Set to the SNMP object;
The SNMP object providing for:
writing the identification of The relay port to the management information base; and
the object server obtains identification of the relay port from the management information base and establishing the relay connection to the TCP/IP gateway.

10. The element management system of claim 8, wherein relaying data packets between the first client connection and the managed device comprises:
with respect to data packets being sent from the first client to the object server:
receiving a data packet on a client socket from the client;
looking up: i) a session ID number that is uniquely associated with the client; and ii) the relay connection that is uniquely associated with the client port of the client socket in a relay table;
building a packaged frame comprising the session number and an encrypted representation of the data packet;
sending the packaged frame on the relay connection; and
with respect to data packets being sent form the object server to the first client;
receiving a packaged frame on the relay connection;
recovering a session ID and the data packet from the packaged frame; and
sending the data packet on the client socket that is uniquely associated with the session ID recovered from the packaged frame.

11. The element management system of claim 10, wherein relaying data packets between the first client connection and the managed device further comprises:
with respect to additional TCP/IP connections established by the first client:
establishing a new TCP/IP connection upon initiation by the first client using a second client socket comprising the client port;
assigning a unique session ID to the second client socket and associating the session ID to the second client socket in the relay table;
sending a new session message and the session ID to the managed device using the relay connection that is associated with the client port;
with respect to additional TCP/IP connections established by the server object:
receiving a new session message and a session ID from the managed device on the relay connection;

establishing a new TCP/IP connection to the first client using a second client socket comprising the client port; and associating the session ID with the second client socket in the relay table.

12. A method of operating an element management system for enabling a network management server to provide a variable value to a management information base of a managed device independent of whether the managed device is coupled to a private network and served by a network address translation firewall, the system comprising:

receiving periodic heart beat frames on a heart beat channel, each heart beat frame being initiated by the managed device and translated by the network address translating firewall, the heart beat channel comprising a translated source socket and a destination socket of the heart beat frame;

storing identification of the heart beat channel in association with identification of the managed device in a registration table;

uniquely associating an assigned UDP port of the element management system with the managed device;

providing the unique association of the assigned UDP port and the managed device to the network management server;

receiving an SNMP Set from the network management server embodied as an IP frame addressed to the assigned UDP port; and sending the SNMP Set to the managed device using the heartbeat channel;

receiving an SNMP Get from the network management server embodied as an IP frame addressed to the assigned UDP port;

assigning a unique sequence number to the SNMP Get and recording the unique sequence number in a message table: i) in association with identification of the managed device associated with the assigned UDP port to which the SNMP Get was addressed; and ii) in association with the source socket of the network management server from which the SNMP Get was sent; and sending the SNMP Get in combination with the unique sequence number to the managed device using the heartbeat channel;

receiving an SNMP Response in combination with the sequence number;

obtaining the source socket corresponding to the sequence number in the message table; and sending the SNMP Response to the source socket of the network management server.

13. The method of operating an element management system of claim 12, wherein:

the SNMP Get in combination with the unique sequence number is sent as an SNMP packaged message, the SNMP packaged message comprising the SNMP Get as encrypted payload and the unique sequence number as a header; and SNMP Response is embodied in an SNMP packaged message, the SNMP packaged message comprising the SNMP Response as encrypted payload and the sequence number as a header.

14. A method of operating an element management system for enabling a network management server to provide a variable value to a management information base of a managed device independent of whether the managed device is coupled to a private network and served by a network address translation firewall, the system comprising:

receiving periodic heart beat frames on a heart beat channel, each heart beat frame being initiated by the managed device and translated by the network address translating firewall, the heart beat channel comprising a translated source socket and a destination socket of the heart beat frame;

storing identification of the heart beat channel in association with identification of the managed device in a registration table;

uniquely associating an assigned UDP port of the element management system with the managed device;

providing the unique association of the assigned UDP port and the managed device to the network management server;

receiving an SNMP Set from the network management server embodied as an IP frame addressed to the assigned UDP port; and sending the SNMP Set to the managed device using the heartbeat channel;

relaying a TCP/IP session between a client and an object server of the managed device, by:

associating a client port with a relay port;

identifying the relay port to the element management system;

establishing a relay connection with the managed device upon initiation of the connection by the managed device through the network address translation firewall;

establishing a first client connection with the client upon initiation of the connection by the client on a socket that comprises the client port;

relaying data packets between the first client connection and the managed device through the relay connection; and wherein, the element management system further provides for receiving identification of the relay port form the TCP/IP gateway and providing the relay port to the managed device using the heart beat channel; and wherein providing the relay port to the managed device using the heart beat channel comprises:

embodying the identification of the relay port within an SNMP Set;

sending the SNMP Get to the device SNMP gateway using the heartbeat channel.

15. The method of operating an element management system of claim 13, wherein relaying data packets between the first client connection and the managed device further comprises:

with respect to additional TCP/IP connections established by the first client;

establishing a new TCP/IP connection upon initiation by the first client using a second client socket comprising the client port;

assigning a unique session ID to the second client socket and associating the session ID to the second client socket in the relay table;

sending a new session message and the session ID to the managed device using the relay connection that is associated with the client port;

with respect to additional TCP/IP connections established by the server object:

receiving a new session message and a session ID from the managed device on the relay connection;

establishing a new TCP/IP connection to the first client using a second client socket comprising the client port; and associating the session ID with the second client socket in the relay table.

\* \* \* \* \*